US011916885B1

(12) United States Patent
Cirello Filho et al.

(10) Patent No.: US 11,916,885 B1
(45) Date of Patent: Feb. 27, 2024

(54) TUNNELLING WITH SUPPORT FOR DYNAMIC NAMING RESOLUTION

(71) Applicant: strongDM, Inc., New York, NY (US)

(72) Inventors: Carlos Ulderico Cirello Filho, Burlingame, CA (US); Philip D. Hassey, Rye, CO (US)

(73) Assignee: strongDM, Inc., New York, NY (US)

( * ) Notice: Subject to any disclaimer, the term of this patent is extended or adjusted under 35 U.S.C. 154(b) by 0 days.

(21) Appl. No.: 18/094,858

(22) Filed: Jan. 9, 2023

(51) Int. Cl.
*H04L 29/06* (2006.01)
*H04L 9/40* (2022.01)

(52) U.S. Cl.
CPC ............ *H04L 63/029* (2013.01); *H04L 63/10* (2013.01)

(58) Field of Classification Search
CPC ....... H04L 63/029; H04L 63/10; H04L 63/20; H04L 63/168; H04L 63/126; H04L 63/101
USPC .............................................................. 726/4
See application file for complete search history.

(56) References Cited

U.S. PATENT DOCUMENTS

| 7,233,569 | B1 | 6/2007 | Swallow |
| 7,752,466 | B2 * | 7/2010 | Ginter ............... G06Q 20/02 713/192 |
| 7,886,339 | B2 | 2/2011 | Keohane et al. |
| 8,102,814 | B2 | 1/2012 | Rahman et al. |
| 8,135,815 | B2 | 3/2012 | Mayer |
| 9,082,402 | B2 | 7/2015 | Yadgar et al. |
| 9,178,793 | B1 | 11/2015 | Marlow |
| 9,239,834 | B2 | 1/2016 | Donabedian et al. |
| 9,300,635 | B1 | 3/2016 | Gilde et al. |
| 9,632,828 | B1 | 4/2017 | Mehta et al. |
| 9,800,517 | B1 | 10/2017 | Anderson |
| 10,075,334 | B1 | 9/2018 | Kozura et al. |
| 10,110,593 | B2 | 10/2018 | Karroumi et al. |
| 10,117,098 | B1 | 10/2018 | Naguthanawala et al. |
| 10,292,033 | B2 | 5/2019 | Beyer, Jr. et al. |
| 10,645,562 | B2 | 5/2020 | Beyer, Jr. |

(Continued)

OTHER PUBLICATIONS

Office Communication for U.S. Appl. No. 17/733,735 dated Jul. 12, 2022, pp. 1-38.

(Continued)

*Primary Examiner* — Longbit Chai
(74) *Attorney, Agent, or Firm* — John W. Branch; Branch Partners PLLC

(57) ABSTRACT

Mesh agents for an overlay network may be provided such that each mesh agent may be hosted on network computers in the overlay network. In response to a network interface providing raw datagrams to a mesh agent in the overlay network further actions may be performed, including: determining a payload protocol based on the raw datagrams; determining payload datagrams included in the raw datagrams based on the payload protocol; determining a request from a client based on the payload datagrams and the payload protocol; or the like. In response to an infrastructure security computer determining validation information that validates the request further actions may be performed, including: modifying the payload datagrams based on the payload protocol and the validation information; modifying the raw datagrams to include the modified payload datagrams; forwarding the modified raw datagrams to a next mesh agent identified with the validation information; or the like.

24 Claims, 14 Drawing Sheets

(56) References Cited

U.S. PATENT DOCUMENTS

| | | |
|---|---|---|
| 10,735,263 B1 | 8/2020 | McAlary et al. |
| 11,075,747 B1 | 7/2021 | Holsman |
| 11,102,147 B2 | 8/2021 | Mehta et al. |
| 11,290,143 B1 | 3/2022 | Sternowski |
| 11,316,822 B1 | 4/2022 | Gawade et al. |
| 11,323,919 B1 | 5/2022 | Parulkar et al. |
| 11,375,300 B2 * | 6/2022 | Sagie ................ H04Q 11/0062 |
| 11,412,051 B1 | 8/2022 | Chiganmi et al. |
| 11,431,497 B1 | 8/2022 | Liguori et al. |
| 11,521,444 B1 | 12/2022 | Badik et al. |
| 11,528,147 B2 | 12/2022 | Madisetti et al. |
| 11,546,323 B1 | 1/2023 | Jones et al. |
| 11,546,763 B1 | 1/2023 | Cirello Filho et al. |
| 11,599,714 B2 | 3/2023 | Munro et al. |
| 11,599,841 B2 | 3/2023 | Anisingaraju et al. |
| 11,620,103 B2 | 4/2023 | Graham et al. |
| 11,729,620 B1 | 8/2023 | Cirello Filho et al. |
| 11,736,531 B1 | 8/2023 | Cirello Filho et al. |
| 11,765,159 B1 | 9/2023 | Crawford et al. |
| 11,765,207 B1 | 9/2023 | McCarthy |
| 11,784,999 B1 | 10/2023 | Jones et al. |
| 2005/0164650 A1 | 7/2005 | Johnson |
| 2005/0209876 A1 | 9/2005 | Kennis et al. |
| 2006/0190991 A1 | 8/2006 | Iyer |
| 2006/0212487 A1 | 9/2006 | Kennis et al. |
| 2006/0240824 A1 | 10/2006 | Henderson et al. |
| 2006/0288204 A1 | 12/2006 | Sood et al. |
| 2007/0009104 A1 | 1/2007 | Renkis |
| 2009/0037607 A1 | 2/2009 | Farinacci et al. |
| 2009/0164663 A1 | 6/2009 | Ransom et al. |
| 2009/0222559 A1 | 9/2009 | Anipko et al. |
| 2011/0225311 A1 | 9/2011 | Liu et al. |
| 2012/0304265 A1 | 11/2012 | Richter et al. |
| 2013/0173794 A1 | 7/2013 | Agerbak et al. |
| 2013/0198558 A1 | 8/2013 | Rao et al. |
| 2013/0268260 A1 | 10/2013 | Lundberg et al. |
| 2014/0044265 A1 | 2/2014 | Kocher et al. |
| 2014/0057676 A1 | 2/2014 | Lord et al. |
| 2014/0136970 A1 | 5/2014 | Xiao |
| 2015/0127949 A1 | 5/2015 | Patil et al. |
| 2015/0135300 A1 | 5/2015 | Ford |
| 2015/0208273 A1 | 7/2015 | Raleigh et al. |
| 2015/0281952 A1 | 10/2015 | Patil et al. |
| 2015/0382198 A1 | 12/2015 | Kashef et al. |
| 2016/0014669 A1 | 1/2016 | Patil et al. |
| 2016/0014818 A1 | 1/2016 | Reitsma et al. |
| 2016/0080128 A1 | 3/2016 | Hebron et al. |
| 2016/0173501 A1 | 6/2016 | Brown |
| 2016/0180102 A1 | 6/2016 | Kim et al. |
| 2016/0262021 A1 | 9/2016 | Lee et al. |
| 2016/0294826 A1 | 10/2016 | Han et al. |
| 2016/0314355 A1 | 10/2016 | Laska et al. |
| 2017/0061956 A1 | 3/2017 | Sarikaya et al. |
| 2017/0103440 A1 | 4/2017 | Xing et al. |
| 2017/0111368 A1 | 4/2017 | Hibbert et al. |
| 2017/0126734 A1 | 5/2017 | Harney |
| 2017/0142810 A1 | 5/2017 | Cho |
| 2017/0279971 A1 | 9/2017 | Raleigh et al. |
| 2017/0339561 A1 | 11/2017 | Wennemyr et al. |
| 2017/0364505 A1 | 12/2017 | Sarikaya et al. |
| 2017/0372087 A1 | 12/2017 | Lee |
| 2018/0061158 A1 | 3/2018 | Greene |
| 2018/0123957 A1 | 5/2018 | Chen et al. |
| 2018/0167373 A1 | 6/2018 | Anderson et al. |
| 2018/0233141 A1 | 8/2018 | Solomon et al. |
| 2018/0288026 A1 | 10/2018 | Callaghan |
| 2018/0359369 A1 | 12/2018 | Golshenas et al. |
| 2018/0367308 A1 | 12/2018 | Kacin et al. |
| 2019/0039569 A1 | 2/2019 | Reed et al. |
| 2019/0073373 A1 | 3/2019 | Surale et al. |
| 2019/0075095 A1 | 3/2019 | Venable et al. |
| 2019/0104411 A1 | 4/2019 | Hotchkiss et al. |
| 2019/0116132 A1 | 4/2019 | Suzuki |
| 2019/0124507 A1 | 4/2019 | Dotchkoff et al. |
| 2019/0147154 A1 | 5/2019 | Das |
| 2019/0349758 A1 | 11/2019 | Zhu et al. |
| 2020/0007540 A1 | 1/2020 | Kawaguchi et al. |
| 2020/0219023 A1 | 7/2020 | Duchastel |
| 2020/0220848 A1 | 7/2020 | Patwardhan |
| 2020/0257179 A1 | 8/2020 | Barnum et al. |
| 2020/0267552 A1 | 8/2020 | Lee et al. |
| 2020/0272911 A1 | 8/2020 | Quiros Araya et al. |
| 2020/0296779 A1 | 9/2020 | Moghe et al. |
| 2020/0322286 A1 | 10/2020 | Mehta et al. |
| 2020/0323030 A1 | 10/2020 | Mehta et al. |
| 2020/0382488 A1 | 12/2020 | Liu et al. |
| 2021/0056524 A1 | 2/2021 | Isgar |
| 2021/0056536 A1 | 2/2021 | Carter et al. |
| 2021/0091941 A1 | 3/2021 | Pancras et al. |
| 2021/0168661 A1 | 6/2021 | Wong et al. |
| 2021/0211423 A1 | 7/2021 | Tan et al. |
| 2021/0223128 A1 | 7/2021 | Kirch |
| 2021/0224091 A1 | 7/2021 | Hayatnagarkar et al. |
| 2021/0226910 A1 | 7/2021 | Ranpise et al. |
| 2021/0281572 A1 | 9/2021 | Fernandez-Spadaro et al. |
| 2021/0294970 A1 | 9/2021 | Bender et al. |
| 2021/0306310 A1 | 9/2021 | Tan |
| 2021/0312400 A1 | 10/2021 | Irimie et al. |
| 2021/0314399 A1 | 10/2021 | Hyun et al. |
| 2021/0344492 A1 | 11/2021 | Goodsitt et al. |
| 2021/0406902 A1 | 12/2021 | Bernert et al. |
| 2022/0007437 A1 | 1/2022 | Goenka et al. |
| 2022/0038544 A1 | 2/2022 | Grinstein et al. |
| 2022/0052850 A1 | 2/2022 | Fagan et al. |
| 2022/0086639 A1 | 3/2022 | Lu et al. |
| 2022/0150312 A1 | 5/2022 | Ranpise et al. |
| 2022/0159029 A1 | 5/2022 | Bendersky et al. |
| 2022/0217084 A1 | 7/2022 | Arora et al. |
| 2022/0263913 A1 | 8/2022 | Zhang et al. |
| 2022/0294540 A1 | 9/2022 | Black et al. |
| 2022/0311767 A1 | 9/2022 | Ouellet |
| 2022/0329477 A1 | 10/2022 | Chiganmi et al. |
| 2022/0334864 A1 | 10/2022 | K N et al. |
| 2023/0007439 A1 | 1/2023 | Williams et al. |
| 2023/0027507 A1 | 1/2023 | He et al. |
| 2023/0032790 A1 | 2/2023 | Mahajan et al. |
| 2023/0059173 A1 | 2/2023 | Moon |
| 2023/0067223 A1 | 3/2023 | Freed et al. |
| 2023/0153447 A1 | 5/2023 | Kapadia |

OTHER PUBLICATIONS

Office Communication for U.S. Appl. No. 17/733,735 dated Nov. 1, 2022, pp. 1-7.

Office Communication for U.S. Appl. No. 17/889,788 dated Nov. 7, 2022, pp. 1-12.

Office Communication for U.S. Appl. No. 17/954,697 dated Jan. 20, 2023, pp. 1-13.

Office Communication for U.S. Appl. No. 18/091,006 dated Mar. 31, 2023, pp. 1-12.

Office Communication for U.S. Appl. No. 17/900,121 dated Apr. 4, 2023, pp. 1-13.

Office Communication for U.S. Appl. No. 18/091,895 dated Apr. 5, 2023, pp. 1-12.

Office Communication for U.S. Appl. No. 18/091,006 dated Apr. 19, 2023, pp. 1-9.

Office Communication for U.S. Appl. No. 17/954,697 dated May 12, 2023, pp. 1-5.

Office Communication for U.S. Appl. No. 18/131,151 dated Jun. 8, 2023, pp. 1-9.

Office Communication for U.S. Appl. No. 18/131,151 dated Jul. 10, 2023, 7 Pages.

Office Communication for U.S. Appl. No. 18/091,895 dated Jul. 11, 2023, 9 pages.

* cited by examiner

TUNNELLING WITH SUPPORT FOR DYNAMIC NAMING RESOLUTION

TECHNICAL FIELD

The present invention relates generally to network security, and more particularly, but not exclusively, to tunnelling with support for dynamic naming resolution.

BACKGROUND

As organizations become increasingly dependent on networked environments, remote services, distributed services, or the like, managing and monitoring infrastructure access in networked environments can become both critically important and more difficult. Difficulties in managing network environments may not be new, however, interconnections among remote offices, data centers, remote employees, remote customers, and so on, have resulted in organizations relying more broadly on heterogeneous distributed networked services, or the like. Also, in some cases, regulatory environments have been adapting to the increase in computer-based services. Accordingly, organizations may be required to comply with regulatory regimes from multiple jurisdictions related to various critical subjects, such as, finance, privacy, employee rights, cross-jurisdiction taxation, and so on. The combination of the increase in reliance on distributed and networked services and ongoing changes in regulatory environments has tended to elevate the importance of managing and monitoring infrastructure access in networked environments both for operations as well as compliance with various regulatory regimes. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
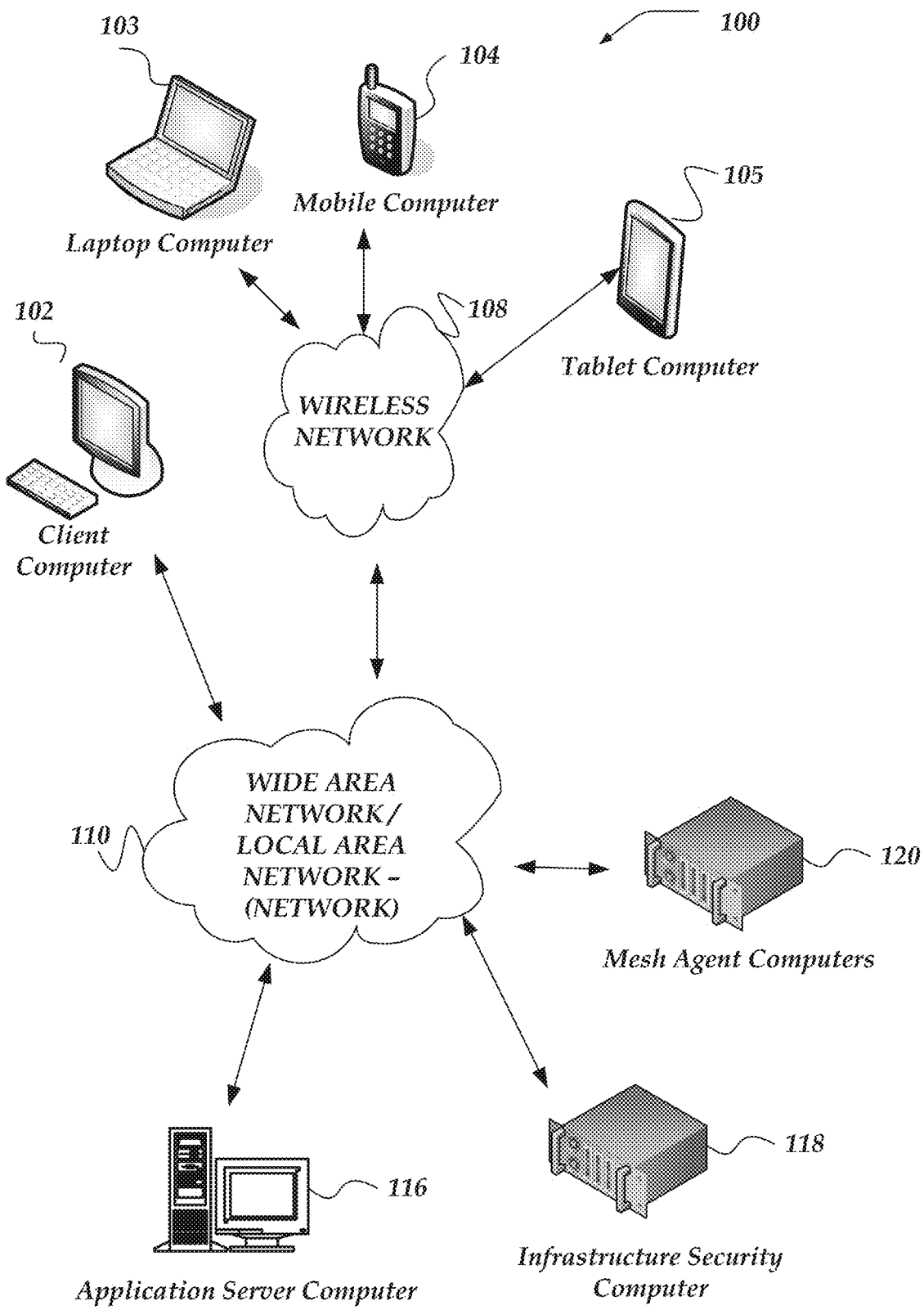
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PUP, Perl, Python, R, Julia, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints in a networked environment. A session is set up or established at a certain point in time, and torn down at a later point in time. An established communication session may involve more than one message in each direction. A session may have stateful communication where at least one of the communicating endpoints saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

As used herein, the term "tuple" refers to a set of values that identify a source and destination of a network communication or network traffic packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the term, "application protocol" refers generally to communication protocols that may be employed in a network that enable one or more applications or services and their client applications to communicate in a networked environment. Application protocols may be considered distinct from transport protocols that may be used to ferry application protocol traffic in networks or among processes/services.

As used herein, the term "mesh agent" refers to programs, process, or services that provide a node, link, or hop in a software defined network. Multiple mesh agents may provide secure tunnels between each other to provide a secure overlay network that may be provided in a conventional underlay network. In some cases, one or more mesh agents may be hosted on network computers in a networked environment.

As used herein, the term "ingress agent" refers to a mesh agent that a client application or user gains access to an overlay network. Ingress agents may be considered mesh agents that are on a logical edge of an overlay network. For example, if a client application requires access to an overlay network to access a protected resource, the first mesh agent that the client application communicates to join or access the overlay network may be considered an ingress agent.

As used herein, the term "egress agent" refers to a mesh agent that may directly communicate with a protected resource. Egress agents may be considered mesh agents that are on a logical edge of an overlay network. For example, client requests provided by a client to an ingress agent may be forwarded through one or more mesh agents in an overlay network until they reach an egress agent associated with the target resource.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to tunnelling with support for dynamic naming resolution. In one or more of the various embodiments, a plurality of mesh agents for an overlay network may be provided such that each mesh agent may be hosted on one or more network computers in the overlay network.

In one or more of the various embodiments, in response to a network interface providing one or more raw datagrams to a mesh agent in the overlay network further actions may be performed, including: determining a payload protocol based on the one or more raw datagrams; determining one or more payload datagrams included in the one or more raw datagrams based on the payload protocol; determining a request from a client based on the one or more payload datagrams and the payload protocol; or the like.

In one or more of the various embodiments, in response to an infrastructure security computer determining validation information that validates the request further actions may be performed, including: modifying the one or more payload datagrams based on the payload protocol and the validation information; modifying the one or more raw datagrams to include the one or more modified payload datagrams; forwarding the one or more modified raw datagrams to a next mesh agent identified with the validation information; or the like.

In one or more of the various embodiments, a name service that associates a plurality of network addresses with a plurality of name values may be provided such that the associations may be provided to the name service by the infrastructure security computer. In one or more of the various embodiments, one or more name values associated with the request may be determined based on the payload protocol. In one or more of the various embodiments, another request to the name service may be provided based on the one or more name values such that a response from the name service includes one or more network addresses associated with the one or more name values.

In one or more of the various embodiments, a payload protocol status may be provided based on the payload protocol and the one or more payload datagrams such that the payload protocol status corresponds to the request. In one or more of the various embodiments, the payload protocol status may be modified based on the one or more modified payload datagrams.

In one or more of the various embodiments, the one or more raw datagrams may be provided to the network interface such that the network interface may be managed by an operating system that hosts the mesh agent. In one or more of the various embodiments, the one or more raw datagrams may be forwarded from the network interface to the mesh agent absent modification or interference by the operating system.

In one or more of the various embodiments, a network address in the overlay network may be determined based on the infrastructure security computer such that one or more portions of the network address include one or more values that the payload protocol reserves for use with processes associated with privileged users. In one or more of the various embodiments, the network address may be assigned to the mesh agent such that the mesh agent may be associated with one or more non-privileged users.

In one or more of the various embodiments, the overlay network may be modified based on one or more updates to the infrastructure security computer such that the one or more updates to the infrastructure security computer include associating one or more network addresses with a portion of the plurality of mesh agents. And, in some embodiments, in response to the association of the one or more network addresses with the portion of the plurality of mesh agents, a name service may be updated to associate the one or more network addresses with name information that corresponds to each mesh agent included in the portion of the plurality of mesh agents.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)—(network) 110, wireless network 108, client computers 102-105, application server computer 116, infrastructure security computer 118, one or more mesh agent computers 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, infrastructure security computer 118, mesh agent computers 120, or other computers.

Client computers 102-105 may further be configured to include a client application that enables an end-user to log into an end-user account that may be managed by another computer, such as application server computer 116, infrastructure security computer 118, mesh agent computers 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to infrastructure security computer 118. Also, client computers may be arranged to enable users to display reports, interactive user-interfaces, results provided by infrastructure security computer 118, mesh agent computers 120, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, infrastructure security computer 118, mesh agent computers 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, infrastructure security computer 118, and mesh agent computers 120 are described in more detail below in conjunction with FIG. 3. Although FIG. 1 illustrates application server computer 116, infrastructure security computer 118, and mesh agent computers 120 each as a single computer, the innovations or embodiments are not so limited. For example, one or more functions of application server computer 116, infrastructure security computer 118, and mesh agent computers 120, or the like, may be distributed across one or more distinct network computers. Moreover, in one or more embodiments, infrastructure security computer 118 may be implemented using a plurality of network computers. Further, in one or more of the various embodiments, application server computer 116, infrastructure security computer 118, or mesh agents 120 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
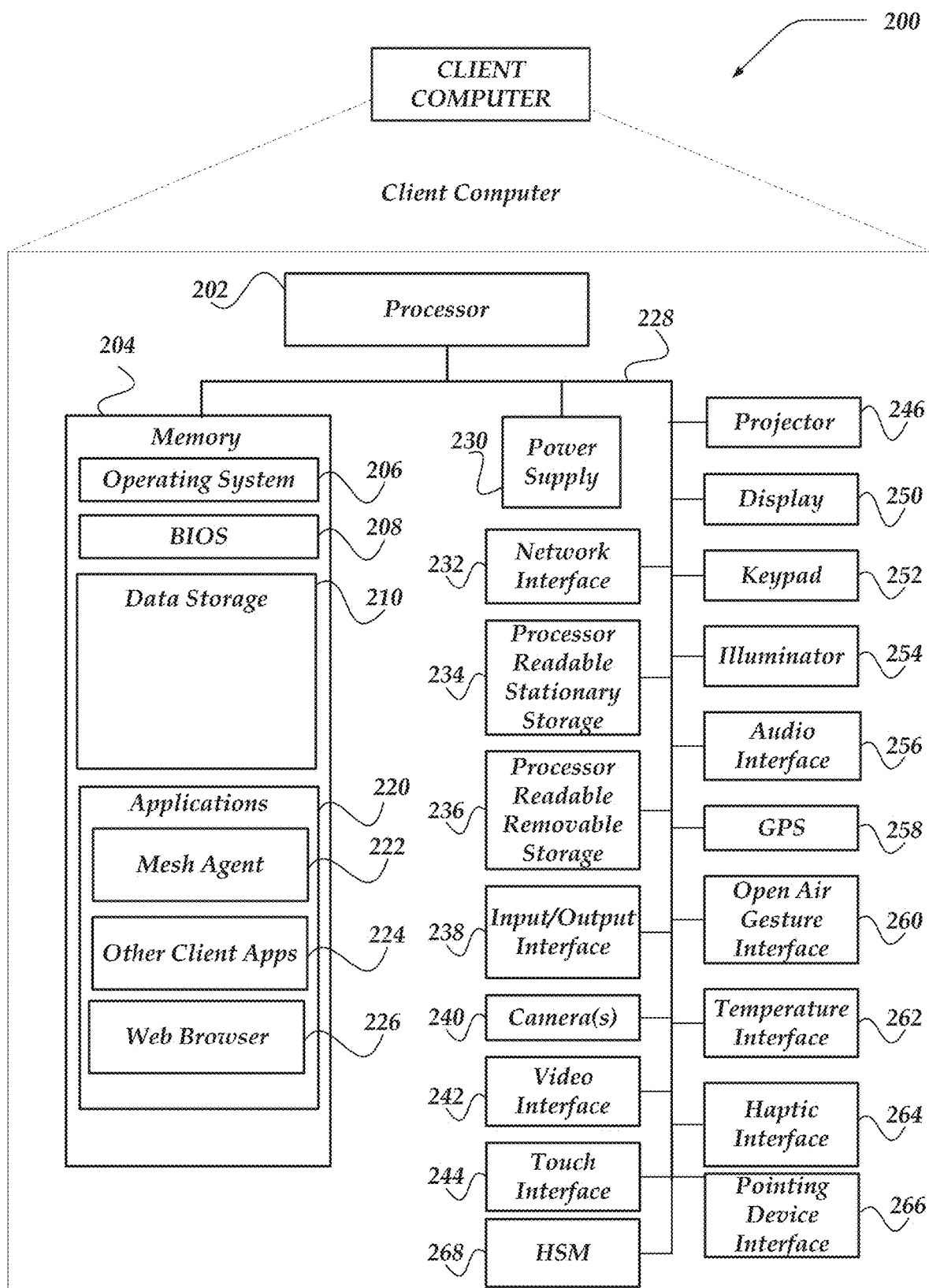
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200. Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, mesh agent 222, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
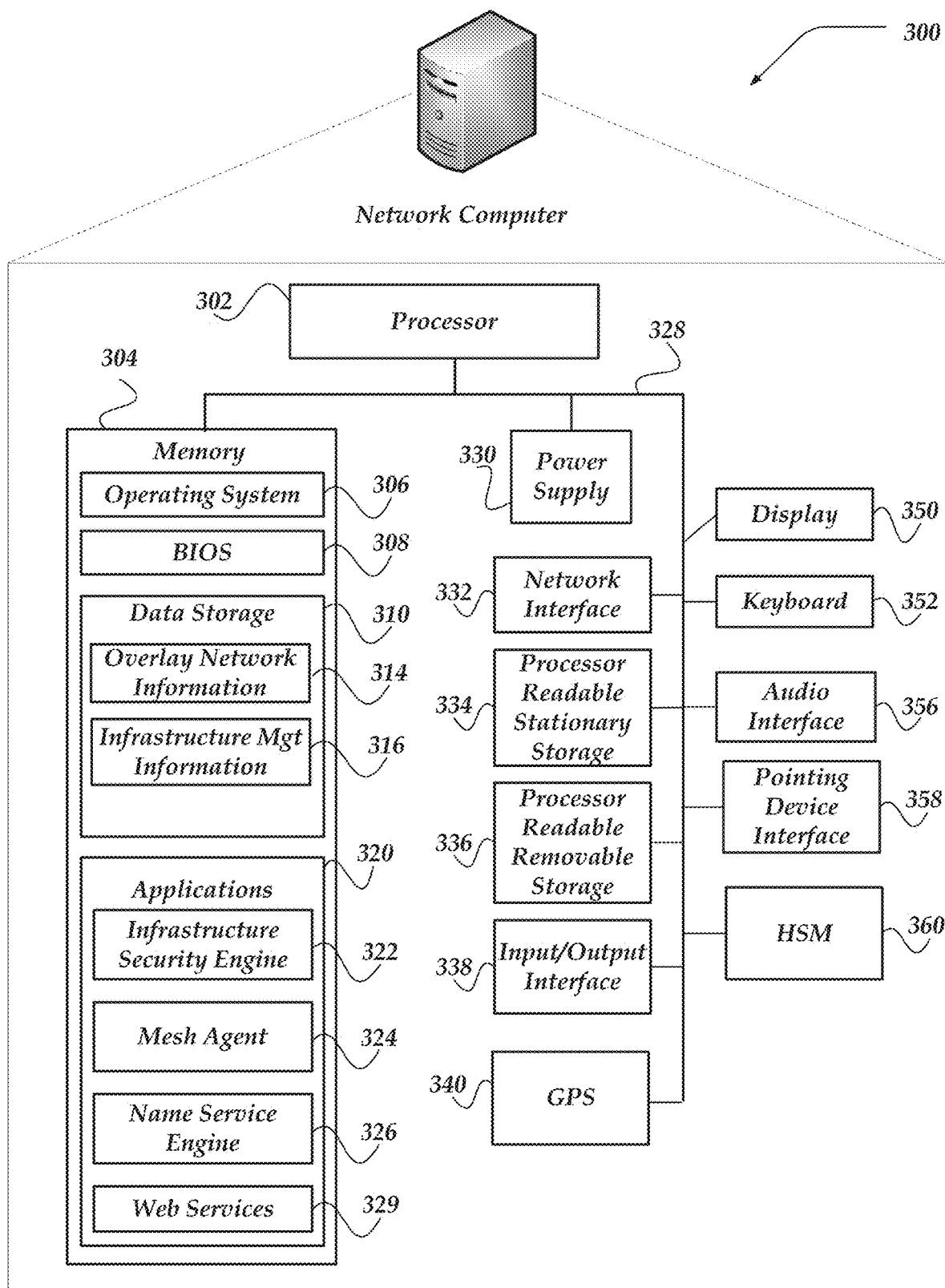
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, infrastructure security computer 118, or mesh agent computers 120 FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, infrastructure security engine 322, mesh agent 324, name service engine, 326, web services 329, or the like, may be arranged to employ geo-location information to select one or more localization features, such as, time zones, languages, currencies, calendar formatting, or the like. Also, localization features may be used when interpreting network traffic, application protocols, modifying/localizing client requests, modifying/localizing server responses, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, overlay network information 314, infrastructure management information 316, activity logs 318, frame capture logs 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include infrastructure security engine 322, mesh agent 324, name service engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, infrastructure security engine 322, mesh agent 324, name service engine 326, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to infrastructure security engine 322, mesh agent 324, name service engine 326, web services 329, or the like, may be provisioned and de-commissioned automatically.

Also, in one or more of the various embodiments, infrastructure security engine 322, mesh agent 324, name service engine 326, web services 329, or the like, may be located in virtual servers running in a cloud-based computing environment rather than being tied to one or more specific physical network computers. Likewise, in some embodiments, one or more of infrastructure security engine 322, mesh agent 324, name service engine 326, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
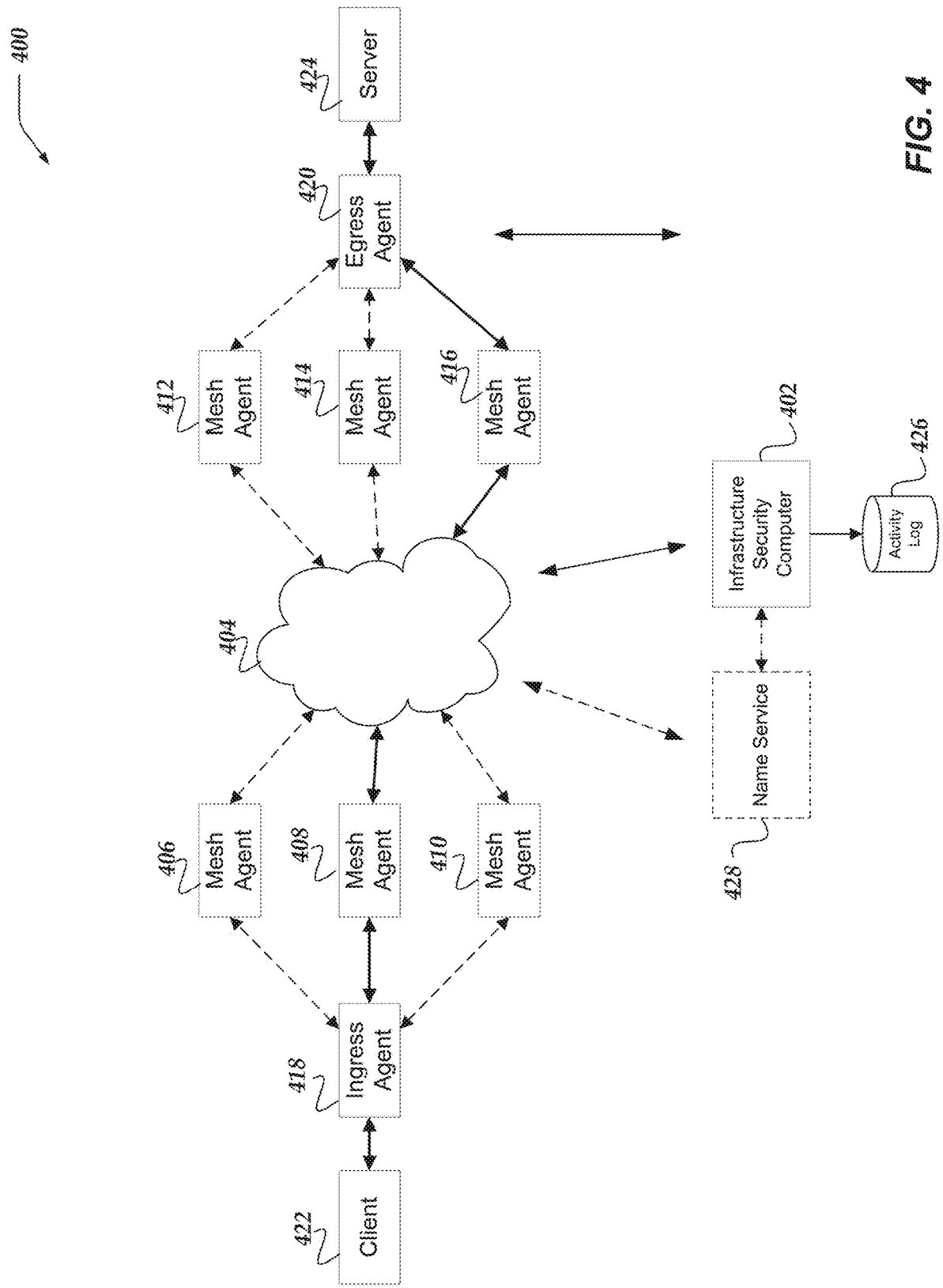
FIG. 4 illustrates a logical architecture of a system for tunnelling with support for dynamic naming resolution in accordance with one or more of the various embodiments.

FIG. 4 illustrates a logical architecture of system 400 for tunnelling with support for dynamic naming resolution in accordance with one or more of the various embodiments. In some embodiments, system 400 may comprise: one or more infrastructure security computers, such as, infrastructure security computer 402; one or more networks, such as, network 404; one or more mesh agents, such as, mesh agents 406-410 or mesh agents 412-416; one or more edge agents, such as, ingress agent 418 or egress agent 420; one or more clients, such as, client 422 or client 424; one or more activity log data stores, such as, activity log 426; one or more name services, such as, name service 428, or the like.

Note, one or more portions of system 400 illustrates a non-limiting example of a software defined network system or overlay network system. One of ordinary skill in the art will appreciate that other mesh network architectures or overlay network management schemes may be employed without departing from the scope of the innovations disclosed herein. However, the description of system 400 is sufficient for enabling one of ordinary skill in the art to understand the innovations disclosed herein.

In one or more of the various embodiments, mesh agents may be arranged to provide a software-defined overlay network that runs on one or more conventionally configured/provisioned physical (underlay) networks. In some embodiments, if a client application attempts to access resources managed by an infrastructure security service, the mesh agent used by clients to gain access to resources in a managed environment may be considered an ingress agent. Similarly, mesh agents that enable resource servers to respond to client request via the overlay network may be considered to be egress agents. Accordingly, in some cases mesh agents may be considered to be ingress agents in some contexts and they may be considered to be egress agents in other contexts. The different nomenclature is used herein as a convenience to describe features of embodiments in the different contexts.

In one or more of the various embodiments, infrastructure security computers, such as, infrastructure security computer 402, may host one or more infrastructure security engines that enforce a secure overlay network that provides managed access to one or more resources (or endpoints) in a networked environment.

In one or more of the various embodiments, if a client employs a mesh agent, such as, ingress agent 418, the ingress agent may be arranged communicate with infrastructure security computer 402 to authenticate the client request and determine a network path from the client to the target resource server via the overlay network.

In one or more of the various embodiments, mesh agents may be arranged to determine a next 'hop' to a next mesh agent. Accordingly, the next mesh agent, as well as, other mesh agents, may determine the next hop to a next mesh agent. Eventually, in some embodiments, the communication or request may reach an egress agent for the target resource server. And, in some embodiments, if each intervening mesh agent validates or authenticates the client communication, the client communication may reach the intended target resource server.

In one or more of the various embodiments, if an ingress agent receives a client request, the ingress agent may send a communication to an infrastructure security computer, such as, infrastructure security computer 402 to determine one or more authorized routes through the overlay network to reach the target resource server. In some embodiments, routes through the overlay network may be considered to be overlay paths that go from mesh agent-to-mesh agent until the target server may be reached.

In one or more of the various embodiments, mesh agents may establish a cryptographically secure virtual network tunnel between clients and servers such that the client/server traffic may be opaque to observers or other network devices that may be unaffiliated with the infrastructure security computer.

Note, one of ordinary skill in the art will appreciate that system 400 may comprise one or more network devices, network computers, routers, switches, or the like, that comprise the underlay network. For brevity and clarity, the underlay network components are omitted from FIG. 4.

In one or more of the various embodiments, mesh agents may be considered to be hosted on physical or virtual computers that have access to the underlay networks. Also, in some embodiments, the number of overlay network hops (between/via mesh agents) between endpoints may be different than the actual network hops required by the underlay network. For example, for some embodiments, system 400 shows one overlay hop to get from ingress agent 418 to mesh agent 408. However, in some cases, there may be multiple hops in the underlay network (not shown) to exchange network traffic between ingress agent 418 and mesh agent 408. For example, in some embodiments, one hop in the overlay network may traverse one or more sub-networks that may require multiple hops through multiple underlay network routers.

In one or more of the various embodiments, if a client provides a request to communicate with a managed endpoint (e.g., resource server 424), the corresponding ingress agent (e.g., ingress agent 418) forwards information about the request to an infrastructure security computer (e.g., infrastructure security computer 402). Accordingly, in some embodiments, an infrastructure security engine (hosted on the infrastructure security computer) may be arranged to determine if the client user has permission to communicate with the target endpoint. Also, in some embodiments, the infrastructure security engine may be arranged to determine one or more next mesh agents where the ingress agent may forward the client request. Accordingly, in some embodiments, infrastructure security engines may be arranged to generate an overlay route table that includes one or more available mesh agents that may be candidates that may be suitable and authorized for handling the communication.

In some embodiments, as client the communication may be forwarded to subsequent mesh agents, each intervening mesh agent may be arranged to validate and authenticate the client communication using the infrastructure security engine. In some embodiments, if the client communication may be authorized, the infrastructure security engine may provide an overlay route table that identifies one or more mesh agents for the next hop through the overlay network.

In this example, the overlay path determined for client 422 to communicate with server 424 is ingress client 418 to mesh agent 408 to mesh agent 416 to egress agent 420 and ultimately to server 424. At the final mesh agent (e.g., egress agent 420), the egress agent may determine/obtain the credentials that enable access to the server. In some embodiments, egress agents may be arranged to communicate with an infrastructure security computer to obtain credentials for a server. In this example, the connections (double-arrow lines) illustrated with solid lines represent the determined route through the overlay network. In contrast, the connections (double-arrow lines) illustrated using dashed lines represent mesh agents that may be part of the overlay network that were not selected for a particular communication between client 422 and server 424.

In one or more of the various embodiments, ingress agents, egress agents, or mesh agents may be configured to capture or record activity that may associated with the communication through the secure tunnel. In this example, for some embodiments, activity log data store 426 represents a data store for storing logged or recorded activity for a managed infrastructure. In some embodiments, infrastructure security engines may be arranged to enable different types of activity logging. In some embodiments, infrastructure security engines may be configured to record one or more of the user information associated with an action, occurrence of actions, the accompanying application payload (if any), response from servers, or the like. Further, in some embodiments, infrastructure security engines may enable log information to be forwarded to another data store for storage or archival.

In one or more of the various embodiments, infrastructure security engines may be arranged to generate authenticity tokens that may act as a fingerprint for activity that may occur during the secure tunnel session. In one or more of the various embodiments, authenticity tokens may be generated based on the payload content, user identities, client identities, or the like, that may be associated with an overlay session. For example, if the secure tunnel session includes a response to a query, the authenticity token may be generated based on a hash of the response to the query. Among other things, in some embodiments, authenticity tokens may be employed as part of a scheme to determine the authenticity activity log information that may be stored elsewhere.

Further, in some embodiments, one or more portions of application protocol information forwarded from client 422 or ingress agent 418 may be incorporated with credential instructions to enable access to target resource servers.

Also, in some embodiments, overlay networks, mesh agents, or the like, may be configured to obtain name information from name service providers, such as, name service 428. Accordingly, in some embodiments, mesh agents, or the like, may employ name service 428 to resolve questions related to associating hostnames with network addresses or vice-versa. In some embodiments, name service 428 is illustrated here using dashed lines because name service engines may be absent or hosted in a variety of arrangements. In some embodiments, name service engines may be hosted locally with mesh agents. In some cases, name service engines may be considered to be embedded in a mesh agent. Alternatively, in some embodiments, name services may be located with the protected network provided by the overlay network. Further, in some cases, name services, such as, name service 428 may be considered to be located on publicly accessible networks (e.g., the Internet).

In one or more of the various embodiments, name service 428 may provide indexes or maps that associate host names, domain names, application names, or the like, with network addresses in the overlay network. Accordingly, in some embodiments, name service engines may be configured to obtain authoritative name information from infrastructure security computers, such as, infrastructure security computer 402. Thus, in some embodiments, name information provided by name service 428 may correspond to current state/status of the overlay network as managed by infrastructure security computer 402.

Note, in some embodiments, innovations disclosed herein may be employed with different overlay networks or in different network environments. System 400 is disclosed to provide context for the claimed innovations.

Figure 5:
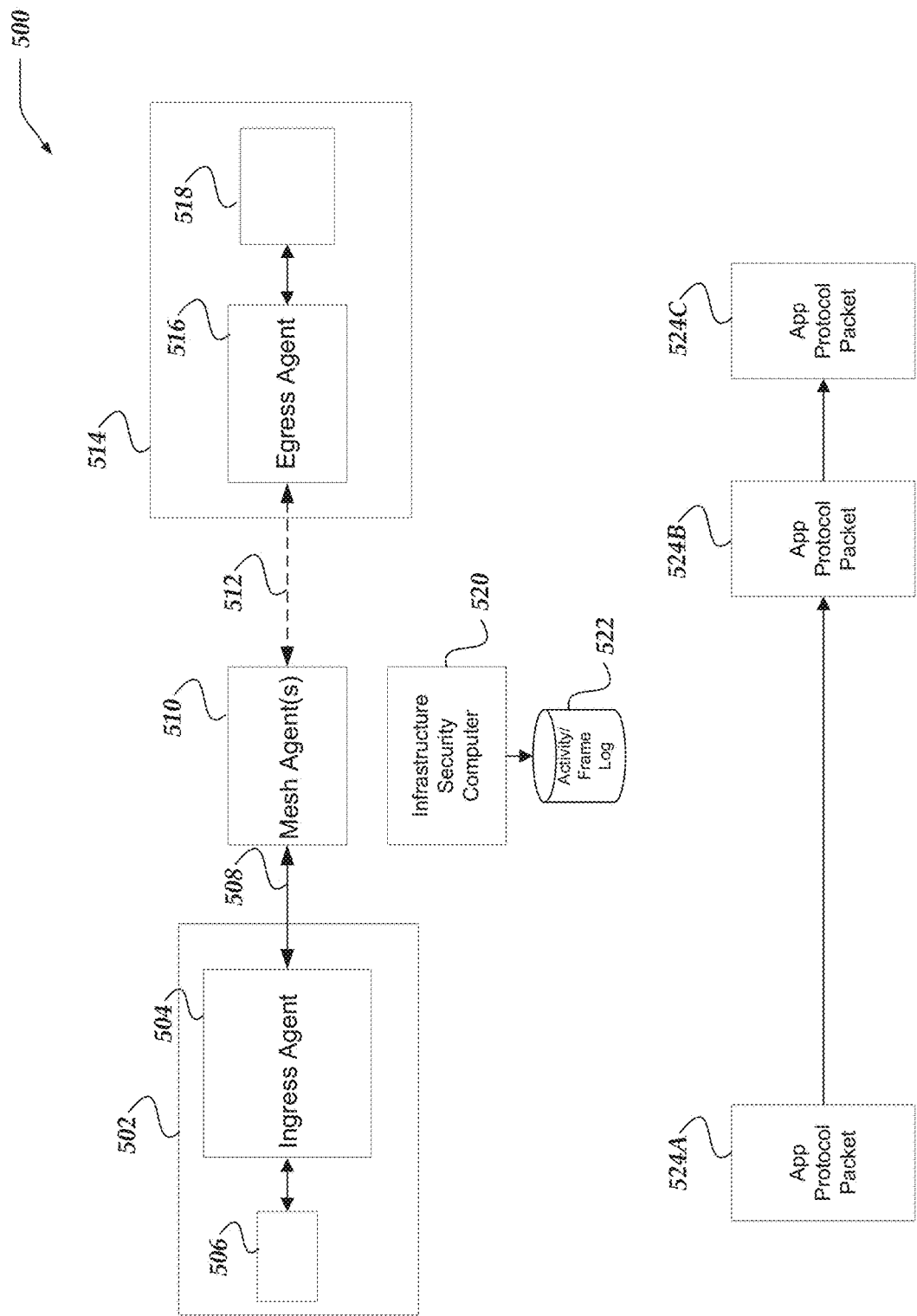
FIG. 5 illustrates a logical schematic of a system for tunnelling with support for dynamic naming resolution in accordance with one or more of the various embodiments.

FIG. 5 illustrates a logical schematic of system 500 for tunnelling with support for dynamic naming resolution in accordance with one or more of the various embodiments. in this example, for some embodiments, system 500 includes client computer 502, ingress agent 504, client application 506, mesh agent(s) 510, target resource computer 514, egress agent 516, resource server 518, infrastructure security server 520, log data store 522. Note, in some embodiments, ingress agents may be considered mesh agents that a client application employs to communicate via an overlay network. Similarly, in some embodiments, egress agents may be considered mesh agents that communicate with server applications. Note, as mentioned above, ingress agents and egress agents may be considered mesh agents that may provide ingress or egress of traffic in the overlay network. Thus, for brevity and clarity mesh agents may be referred to as ingress agents, egress agents, or mesh agents depending on their immediate role in an overlay communication session. In this example, for some embodiments, network path 508 may represent communication over a single overlay network hop of a secure tunnel that may comprise one or more underlay network hops to reach the computer that is hosting mesh agent 510. Likewise, network path 512 may represent one or more overlay network hops (intervening mesh agents not shown) that reach target computer 514 and egress agent 516.

As described above, in some embodiments, mesh agents may be arranged to communicate with infrastructure security engines that may be hosted on infrastructure security computers, such as, infrastructure security computer 520. Also, in some embodiments, infrastructure security engines may be arranged to log overlay session activity into activity log data store 522.

In one or more of the various embodiments, client applications, such as, client application 506 may employ one or more application protocols to communicate with resource servers, such as, resource server 518. In some embodiments, application protocols may define particular data in particular arrangements or sequences that enable client applications to communicate with associated/related server applications. In some embodiments, two or more applications or services may share the same application protocol. Also, in some embodiments, one or more applications may employ unique or custom protocols to enable communication between clients or servers. In some embodiments, servers may provide one or more APIs or interfaces that enable applications to access the servers rather than requiring dedicated/proprietary client applications. In such circumstances, a program or service configured to employ such APIs or interfaces may be considered a client application.

In some embodiments, application protocol packets originating from client applications may be provided to ingress agents and subsequently forwarded through the overlay network until they reach the egress agent. Accordingly, in some embodiments, egress agents may be arranged to act as an endpoint to the connection from the client application.

In this example, for some embodiments, application protocol packet 524A represents one or more packets of network traffic that may be sent from a client application, such as, client application 506. Accordingly, the application protocol packet may be routed through the overlay network until it reaches its egress agent. In this example, application protocol packet 524B represents the application protocol packet at the egress agent for the client request. And, in this example, for some embodiments, application protocol packet represents application protocol packets sent from an egress agent to the target resource server.

In one or more of the various embodiments, egress agents may be arranged to re-write application protocol packets to enforce one or more requirements or one or more features of the overlay network. For example, if an application protocol defines one or more fields for holding credential information, egress agents may be arranged to insert the appropriate credential information into the application protocol packets before communicating them to the target resource server. Thus, in some embodiments, credential information provided by the client (if any) may be automatically replaced by other credential information determined by the egress agent.

Accordingly, in some embodiments, egress agents may be arranged to communicate with infrastructure security computers to obtain credential instructions that declare one or more actions the egress agent may perform to obtain or activate credential information to access the target resource server. In some embodiments, egress agents may be arranged to replace the credential information included in application protocol packet 524B (if any) with credential information determined based on credential instructions provided by its associated infrastructure security computer. Further, in some embodiments, egress agents may be arranged to perform one or more 'fix-up' operations on application protocol packet 524B, such as, computing hash signatures based on packet content, adjusting packet size field values, adjusting sequence numbers, adjusting packet offset/pointer values (e.g., values that point to the location of particular values or sections in a given packet), or the like. Accordingly, in some embodiments, application protocol packet 524C represent a modified packet that includes credential information as well as other packet modifications that may be required for a particular application protocol or credential mechanism.

Figure 6:
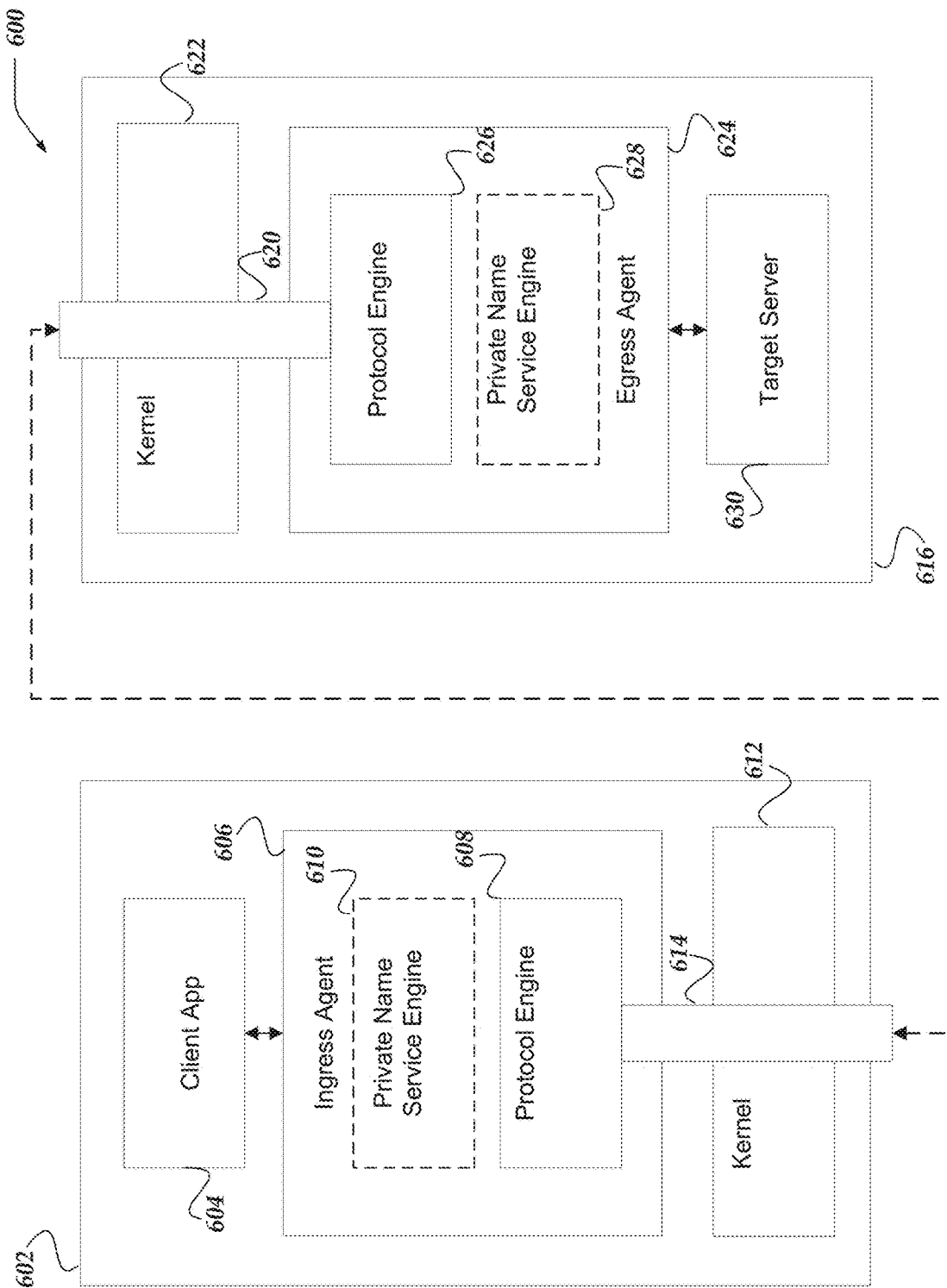
FIG. 6 illustrates a logical schematic of a system for tunnelling with support for dynamic naming resolution in accordance with one or more of the various embodiments.

FIG. 6 illustrates a logical schematic of system 600 for tunnelling with support for dynamic naming resolution in accordance with one or more of the various embodiments. As described above, in some embodiments, mesh agents may take the role of an ingress agent, such as, ingress agent 602. Further, in some cases, for some embodiments, mesh agents may take the role of an egress agent, such as, egress agent 616.

Accordingly, in some embodiments, client applications, such as, client application 604 may be configured to route client requests to ingress agent 606. Accordingly, in some embodiments, ingress agent 608 may be arranged to employ protocol engine 608 to implement one or more of a communication protocol or an application protocol that conforms to requirements or expectations of the target server application, the overlay network, the underlay network, or the like.

In some embodiments, if a client request is provided to protocol engine 608, the protocol engine may generate or provide one or more raw datagrams that conform to the raw network protocol, such as, Internet Protocol (IP).

In some cases, in some embodiments, mesh agents, such as, ingress agent 606 may be arranged to employ a local or embedded name service engine, such as, private name service engine 610. As described above, mesh agents may be arranged to request name information from name service engines. In some embodiments, name service engines may be configured to provide name information that is based on information provided by infrastructure security computers rather than from conventional name service systems (e.g., DNS with hierarchically arranged authority). Note, in some cases, mesh agents may be configured to employ name service engines that are hosted remotely on servers in the overlay network or on otherwise publicly accessible servers.

Further, in some embodiments, the raw datagrams may be communicated to the overlay network via connection tunnel 614.

In some embodiments, the overlay network may employ the underlay network to route and deliver the raw datagrams to egress agent 616. Accordingly, in some embodiments, the raw datagrams may be routed or provided to connection tunnel 620. In some embodiments, kernel 622 may forward the raw datagrams to egress agent 624. In some embodiments, protocol engine 626 may receive the raw datagrams and use the included information to implement one or more communication protocols or application protocols that conform the requirements of target server 630. For example, in some embodiments, if target server 630 communicates with clients using TCP/IP, protocol engine 626 may extract the content from the raw datagrams and generate TCP compatible traffic to provide to target server 630. Optionally, in some embodiments, egress agent 616 may be configured to employ a local or embedded name service engine, such as, name service engine 628, to associate various network names to network addresses or vice-versa. Alternatively, in some embodiments, mesh agents may employ remotely hosted name service engines that may be arranged to associate various network names to network addresses or vice-versa.

Figure 7:
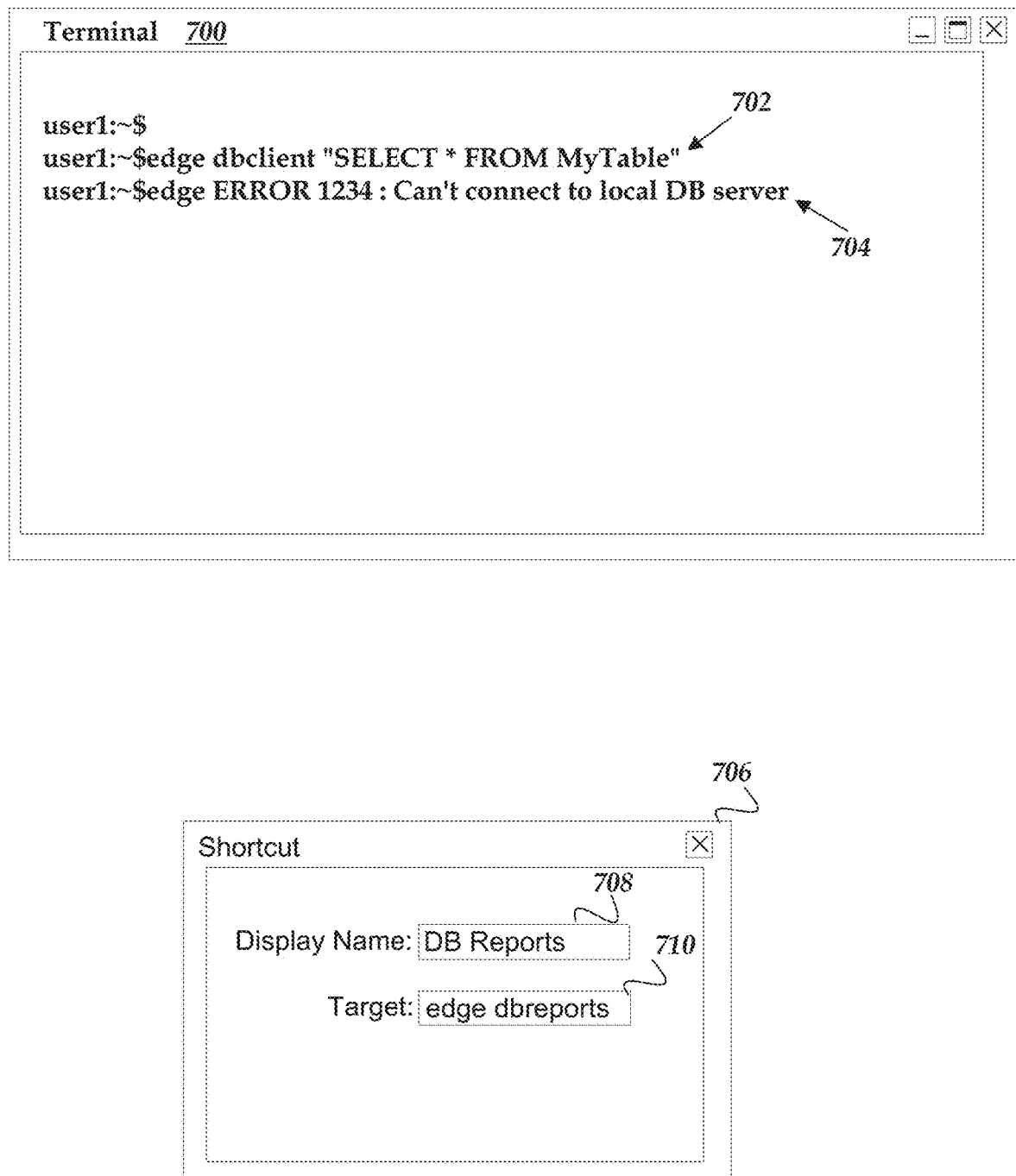
FIG. 7 illustrates a logical schematic of a terminal and a shortcut for tunnelling with support for dynamic naming resolution in accordance with one or more of the various embodiments.

FIG. 7 illustrates a logical schematic of terminal 700 and shortcut 706 for tunnelling with support for dynamic naming resolution in accordance with one or more of the various embodiments. In some embodiments, terminal 700 may represent a computer terminal application that enables users access to command-line interfaces for various applications. In this example, for some embodiments, command line 702 represents a command line that may be provided by a user. In this example, the user is attempting to retrieve data from a remote database using the program dbclient. In the example, the command 'dbclient' is shown as prefixed by the command 'edge'. Accordingly, in this example, the prefix represents a command to employ an ingress agent to execute the dbclient. Accordingly, in this example, rather than routing the dbclient command via the conventional underlay network, the ingress agent may capture the execution of dbclient and employ the overlay network to establish a secure tunnel for the requested operation.

Similarly, in some embodiments, shortcut 706 illustrates how a shortcut for a GUI based operating system or window manager may be configured to route commands initiated from a desktop (e.g., mouse-clicks) through secure tunnels in the overlay network. In this example, shortcut 706 includes an application display name, such as, display name 708 and a launch/execution command represented by target 710. Thus, in this example, shortcuts may be configured to enable launched applications to access the overlay network.

Note, often client applications may support users providing server identifiers (e.g., URIs, IP addresses, hostnames, or the like) that may declare the server that for the client application. For example, a conventional command to launch a dbclient application may include the hostname where the database server of interest is located. However, for resources in the overlay network, the infrastructure security engines may determine the location of the server.

Figure 8:
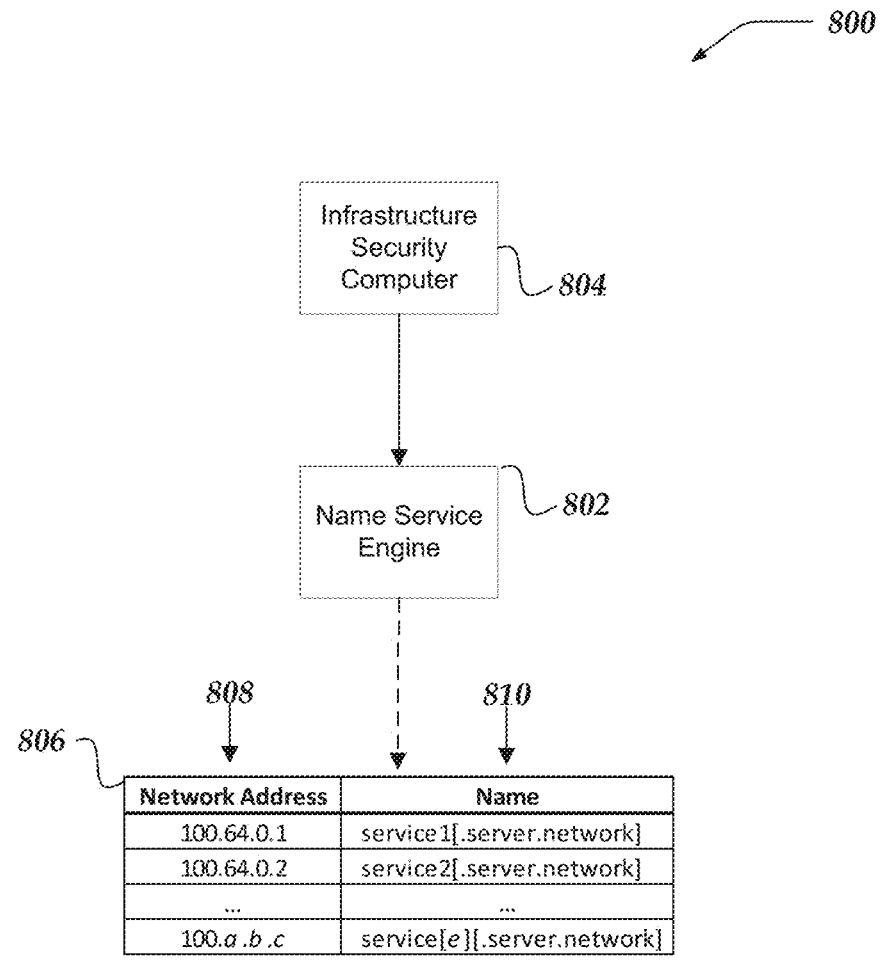
FIG. 8 illustrates a logical schematic of a system for tunnelling with support for dynamic naming resolution in accordance with one or more of the various embodiments.

FIG. 8 illustrates a logical schematic of system 800 for tunnelling with support for dynamic naming resolution in accordance with one or more of the various embodiments.

As described above, in some embodiments, name service engines, such as, name service engine 802 may be arranged to maintain various name indexes or reverse indexes based on information provided by infrastructure security computers, such as, infrastructure security computer 804. Accordingly, in some embodiments, if a mesh agent requests name information, the information may be based on rules, configuration, policies, or the like, enforced by the infrastructure security computers for the overlay network.

Accordingly, in some embodiments, name service engines may be arranged to communicate with clients using conventional DNS protocols, However, in some embodiments, the responses may be based in part or fully on the name/address information provided by infrastructure security computers.

For example, table 806 may represent data structures that name service engines may employ for matching names in the overlay network with address locations within the overlay network with column 808 represent network address information and column 810 represent name information. Note, while this example may appear to include conventional TCP/IP or DNS information, the innovations are not so limited. In some embodiments, name service engines may be customized to obtain name information or network information from a infrastructure security computer rather than from a conventional DNS hierarchy/system. Thus, in some embodiments, name service engines, such as, name service engine 802 may employ rules, policies, or the like, that deviate from conventional DNS or TCP standards. For example, if name information requested by a mesh agent is unavailable locally, name service engine 802 may be arranged to submit a request to its associated infrastructure security computer rather than forwarding the request to other public DNS servers. Likewise, in some embodiments, name service engine may be configured to disregard requests associated with names or addresses that are not currently in its indexes rather than attempting to forward the requests to other DNS providers.

Also, in some embodiments, name service engines such as name service engine 802 may be arranged to support conventional DNS application protocols such that client applications or server applications in the overlay network may submit DNS requests to a name service engine without knowledge that the name service engine is not a normal public DNS. Thus, in some embodiments, applications hosted in the overlay network may make conventional DNS requests without modification. However, in some embodiments, the responses to the DNS requests, if any, may depend on the naming information provided by infrastructure security computers, such as, infrastructure security computer 804.

Generalized Operations

FIGS. 9-14 represent generalized operations for tunnelling with support for dynamic naming resolution in secured networks in accordance with one or more of the various embodiments. In one or more of the various embodiments, processes 900, 1000, 1100, 1200, 1300, and 1400 described in conjunction with FIGS. 9-14 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 9-14 may be used for tunnelling with support for dynamic naming resolution in accordance with at least one of the various embodiments or architectures such as those described in conjunction with FIGS. 4-8. Further, in one or more of the various embodiments, some or all of the actions performed by processes 900, 1000, 1100, 1200, 1300, and 1400 may be executed in part by infrastructure security engine 322, one or more mesh agents, such as, mesh agent 324, name service engine 326, or the like, running on one or more processors of one or more network computers.

Figure 9:
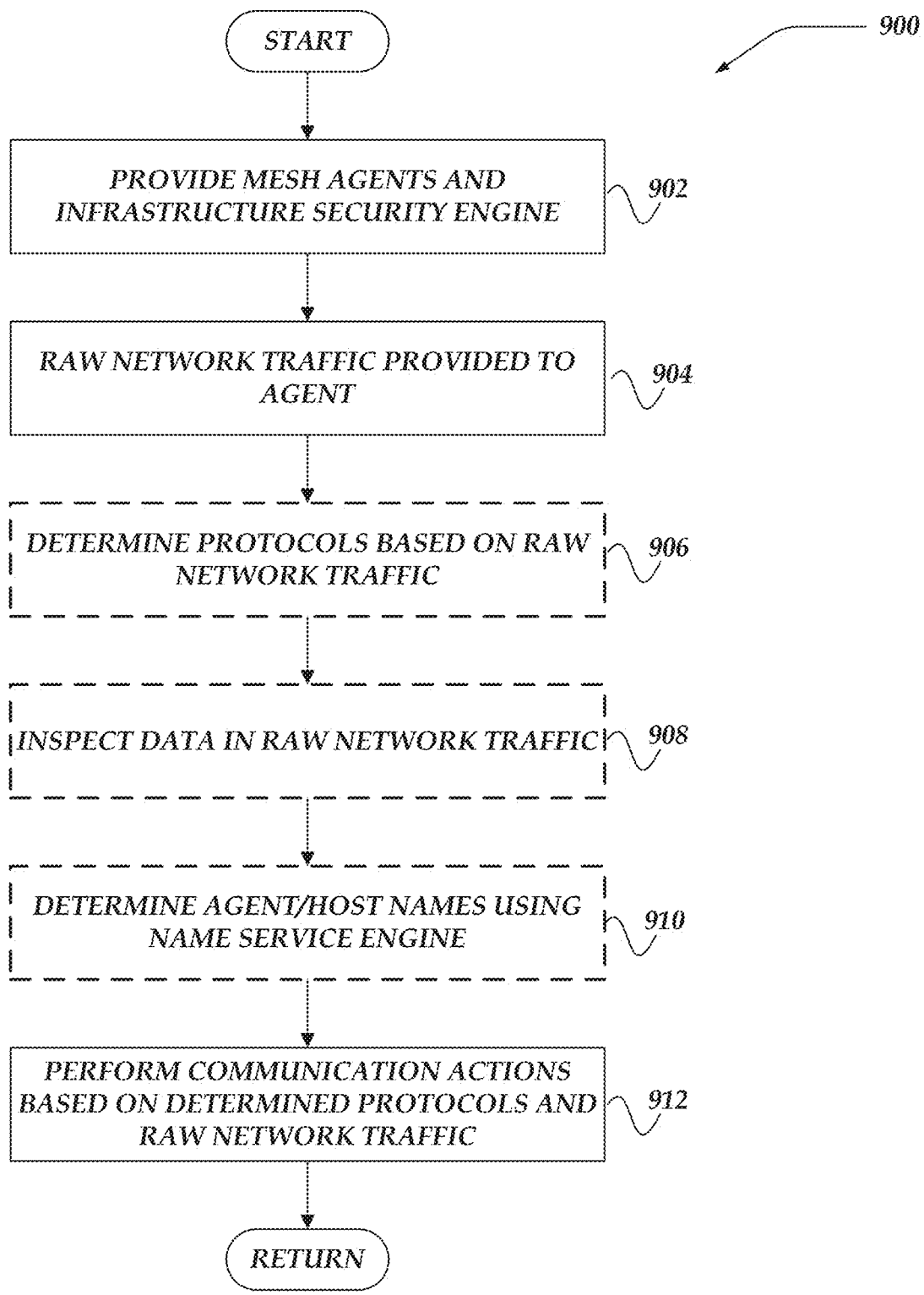
FIG. 9 illustrates an overview flowchart of a process for tunnelling with support for dynamic naming resolution in secured networks in accordance with one or more of the various embodiments.

FIG. 9 illustrates an overview flowchart of process 900 for tunnelling with support for dynamic naming resolution in secured networks in accordance with one or more of the various embodiments. After a start block, at block 902, in one or more of the various embodiments, an overlay network that includes one or more mesh agents and one or more infrastructure security computers may be provided.

At block 904, in one or more of the various embodiments, raw network traffic may be provided to a mesh agent.

At block 906, in one or more of the various embodiments, optionally, protocol engines may be arranged to determine one or more communication protocols based on the raw network traffic.

Note, this block is indicated as being optional because in some cases, for some embodiments, the high level communication protocols or application protocols may be known in advance based on one or more policies, configurations, default settings, or the like.

At block 908, in one or more of the various embodiments, optionally, the protocol engines or mesh agents may be arranged to inspect the contents of the raw network traffic.

Note, this block is indicated as being optional because in some cases, for some embodiments, a mesh agent or protocol engine may be configured to omit inspection of the raw network traffic.

At block 910, in one or more of the various embodiments, optionally, the mesh agent may be arranged to determine name information associated with the raw network traffic.

Note, this block is indicated as being optional because in some cases, for some embodiments, it may be unnecessary to determine naming information for a given request or response.

At block 912, in one or more of the various embodiments, protocol engines or mesh agents may be arranged to execute one or more communication actions based on the determined protocols and the raw network traffic.

Next, in one or more of the various embodiments, control may be returned to a calling process.

Figure 10:
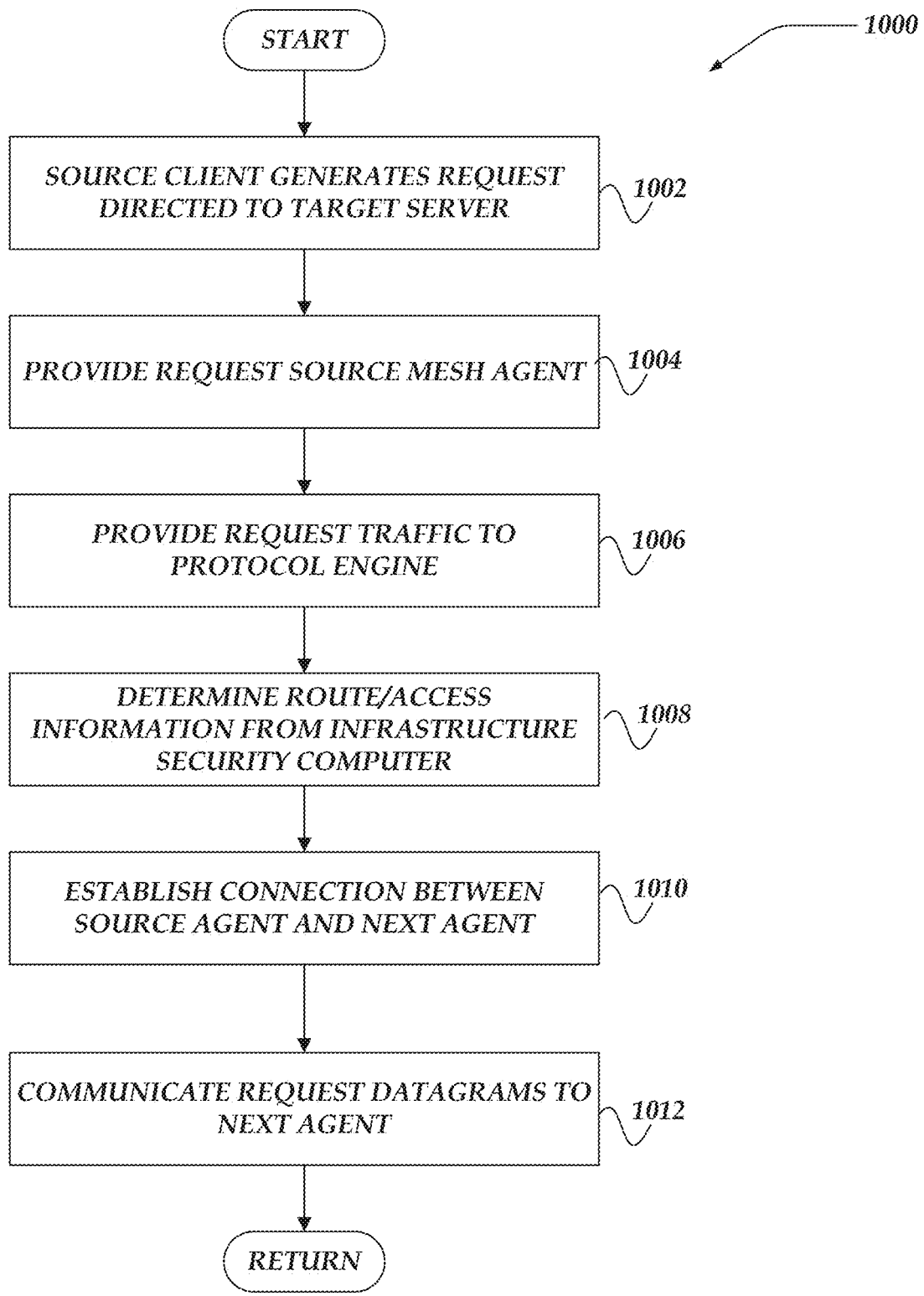
FIG. 10 illustrates a flowchart of a process for tunnelling with support for dynamic naming resolution in secured networks in accordance with one or more of the various embodiments.

FIG. 10 illustrates a flowchart of process 1000 for tunnelling with support for dynamic naming resolution in secured networks in accordance with one or more of the various embodiments. After a start block, at block 1002, in one or more of the various embodiments, a source client may generate request directed to a target server. As described above, client applications configured to operate within the overlay network may send requests to that are intended to be routed through the overlay network to a target server application. In some embodiments, such client applications may be configured to route messages (e.g., request) to a local mesh agent that acts as the ingress agent for the communication session.

At block 1004, in one or more of the various embodiments, the source client may be arranged to provide the request to a source mesh agent. As mentioned, the first destination of the request from the source client application may be its ingress agent that provides a gateway to the overlay network. In some embodiments, mesh agent computers that host client applications that have access to the overlay network may be configured to route requests or other traffic from the client applications to a gateway interface that enables access to the overlay network according to policies/privileges that may be enforced by an infrastructure security computer.

At block 1006, in one or more of the various embodiments, the source mesh agent may be arranged to provide the request to a protocol engine. In some embodiments, the raw datagrams comprising the client request may be passed through the local network services of the operating system directly to a protocol engine corresponding to the mesh agent. Accordingly, in some embodiments, various protocol level limitations built into (or enforced by) host operating system may be bypassed. For example, in some embodiments, protocol engines may be arranged to override operating system limitations, such as, port ranges, connection limits, timeouts, or the like.

At block 1008, in one or more of the various embodiments, the source mesh agent may be arranged to determine route information or access information associated with the request from its infrastructure security computer. In one or more of the various embodiments, protocol engines may be arranged to examine the raw datagrams to determine the target of the request. Also, in some embodiments, protocol engines may be arranged to examine the payload of the raw datagrams to determine information about the payload protocol that may be carried in the raw datagrams. Accordingly, in some embodiments, the ingress agent may provide additional information associated with the particular target application, such as, application target, API calls, command values, security information, or the like.

Accordingly, as described above, the infrastructure security computer may be arranged to evaluate if the request conforms to current security policies. Thus, in some embodiments, the infrastructure security computer may provide route information to the ingress agent. This route information may be employed to determine which mesh agents in the overlay network comprise the next hops that may be employed to forward the request to the egress agent that corresponds to the target server/application.

At block 1010, in one or more of the various embodiments, the source mesh agent may be arranged to establish a connection to a next mesh agent. If the infrastructure security computer allows the request to proceed, a connection to the next mesh agent may be established using the raw datagram protocol. In some embodiments, protocol engines may be arranged to manage or marshal the connection handshake exchanges between the mesh agents that may be participating in the communication.

At block 1012, in one or more of the various embodiments, the source mesh agent may be arranged to communicate the raw datagrams carrying the request to the next mesh agent. In some embodiments, the traffic leaving each mesh agent may be raw datagrams that include one or more payload protocol datagrams. In some cases, for some embodiments, the protocol engine or mesh agent may modify the payload protocol datagrams to conform to policies enforced by the infrastructure security computer. For example, in some embodiments, mesh agents may be arranged to modify network address tuple information, sequence numbers, various header fields, payload contents, or the like, to enforce overlay network policies.

Next, in one or more of the various embodiments, control may be returned to a calling process.

Figure 11:
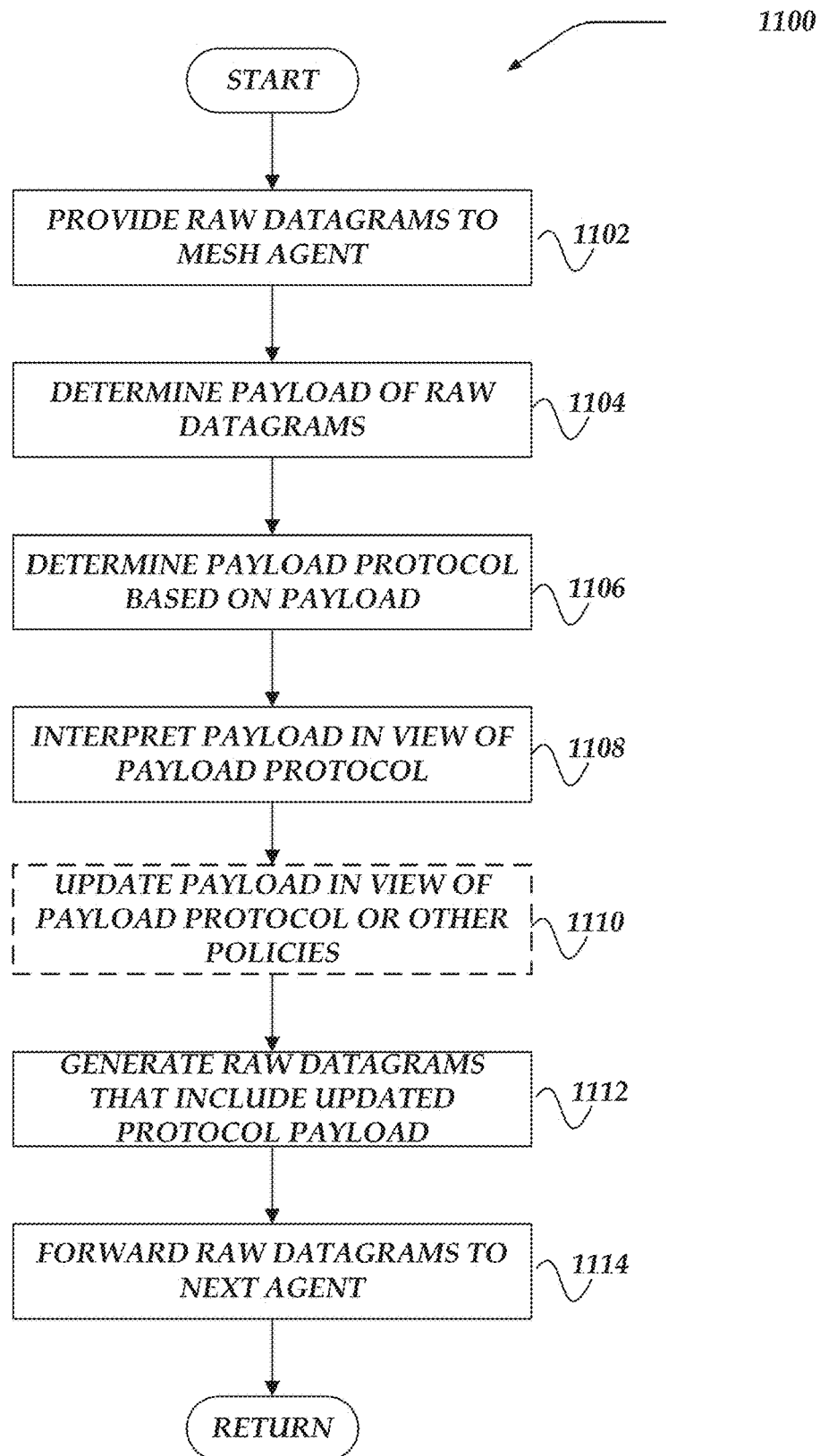
FIG. 11 illustrates a flowchart of a process for tunnelling with support for dynamic naming resolution in secured networks in accordance with one or more of the various embodiments.

FIG. 11 illustrates a flowchart of process 1100 for tunnelling with support for dynamic naming resolution in secured networks in accordance with one or more of the various embodiments. After a start block, at block 1102, in one or more of the various embodiments, an overlay network may provide one or more raw datagrams to a mesh agent. As described above, in some embodiments, overlay network may include two or more mesh agents and one or more infrastructure security computers. As clients/applications/services within the overlay network communicate, network traffic may be exchanged between the mesh agents that are part of paths through the overlay network. As described, these paths through the overlay network may be routed over physical or virtual components of an underlay network.

Accordingly, in some embodiments, mesh agents involved in a communication session between a source/client application and a target/server application may be provided raw datagrams the comprise the communication (e.g., requests/responses).

In some embodiments, raw datagrams may be provided to a network interface that may be configured to bypass operating system/kernel level management of the communication. Accordingly, in some embodiments, raw datagrams that may be arriving at the network interface may be provided directly the mesh agent where its protocol engine may process the communication traffic.

At block 1104, in one or more of the various embodiments, the mesh agent may be arranged to determine a payload that may be included in the one or more raw datagrams. As described above, raw datagrams may be comprised of network packets that conform to a low-level communication protocol that is supported by the underlay network. For example, in some embodiments, raw datagrams may conform to the Internet Protocol (IP). Accordingly, in some embodiments, protocol engines may be arranged to evaluate raw datagrams to determine if they conform to one or more low-level network protocols.

In some embodiments, protocol engines may be arranged to reject raw datagrams that may not conform to low-level protocol. In some embodiments, protocol engines may be arranged to support more than one low-level protocol. Accordingly, in some embodiments, protocol engines may be arranged to examine the raw datagrams to determine an associated low-level protocol. In some embodiments, if the low-level protocol is determined, protocol engines may be enabled to identify various portions of the raw datagrams. Thus, in some embodiments, protocol engines may be arranged to the payload portion of the raw datagrams.

In one or more of the various embodiments, payload portions of the raw datagrams may be considered the portions of the raw datagrams that may include or embed high-level communication protocols.

At block 1106, in one or more of the various embodiments, the mesh agent may be arranged to determine a payload protocol based on the payload. In one or more of the various embodiments, the payload portion of the raw datagrams may include data/traffic that conforms to one or more higher-level communication protocols. For example, if the low-level protocol corresponding to the raw datagrams may be IP, the higher-level payload protocol may be TCP, UDP, or the like.

At block 1108, in one or more of the various embodiments, the mesh agent may be arranged to interpret the payload in view of the payload protocol.

In some embodiments, protocol engines may be arranged to support one or more communication protocols. Accordingly, in some embodiments, protocol engines may be arranged to manage the state of communication sessions that may be required to implement. Including, in some cases, protocol engines may be arranged to simultaneously track multiple connections and run the communication protocols used by the various connections/sessions.

Also, in some cases, for some embodiments, the payload protocol may include higher-level application protocols that may be specific to one or more particular applications. For example, in some embodiments, payloads may carry one or more "messages" that conform to an application protocol. Accordingly, in some cases, for some embodiments, protocol engines may be arranged to manage/monitor application protocol level datagrams.

Further, in some embodiments, protocol engines may be arranged to employ various filters, rules, instructions, plug-ins, libraries, or the like, directed to one or more payload protocols or one or more application protocols. Also, in some embodiments, infrastructure security computers may provide policy rules to mesh agents or protocol engines that may be evaluated to determine if particular payload protocols or application protocols may be used. For example, in some embodiments, infrastructure security computers may be configured to disallow one or more particular payload protocols or application protocols. Likewise, in some embodiments, infrastructure security computers may provide policy rules that designate one or more allowed protocols such that datagrams embedding other protocols may be blocked or discarded.

At block 1110, in one or more of the various embodiments, optionally, the mesh agent may be arranged to update the protocol payload in view of the payload protocol or one or more policies or considerations.

In some cases, for some embodiments, protocol engines or mesh agents may be arranged to modify the contents of payload protocol datagrams. In some cases, this may include removing or substituting values for one or more fields in the payload protocol datagrams to conform to one or more policies. In some embodiments, infrastructure security computers may provide mesh agents policy rules that declare which fields/values should be examined or modified. For example, in some embodiments, credential information (e.g., usernames, passwords, or the like) may be injected/modified in the payload protocol datagrams. For example, in some embodiments, a source application may submit dummy credentials that may be replaced with actual credential information that may be obscured or otherwise hidden from the user.

At block 1112, in one or more of the various embodiments, the mesh agent may be arranged to generate one or more raw datagrams that include the updated protocol payload. In one or more of the various embodiments, protocol engines may be arranged to modify the received raw datagrams in-place. Also, in some cases, for some embodiments, protocol engines may be arranged to copy new/updated payload protocol datagrams into the raw datagrams. Also, in some embodiments, protocol engines or mesh agents may be arranged to generate new raw datagrams that include the payload protocol datagrams.

Note, this block is indicated as being optional because in some embodiments raw datagrams that were received may be passed through without modification.

At block 1114, in one or more of the various embodiments, the mesh agent may be arranged to forward the raw datagrams to a next mesh agent.

As described above, in some embodiments, each mesh agent involved in a communication session may be one of an ingress agent, an egress agent, or one or more mesh agents that comprise a path from the ingress agent to the egress agent. Accordingly, in some cases, the raw datagrams may be passed to the next-hop on their way to or from the ultimate endpoints of the communication sessions.

Next, in one or more of the various embodiments, control may be returned to a calling process.

Figure 12:
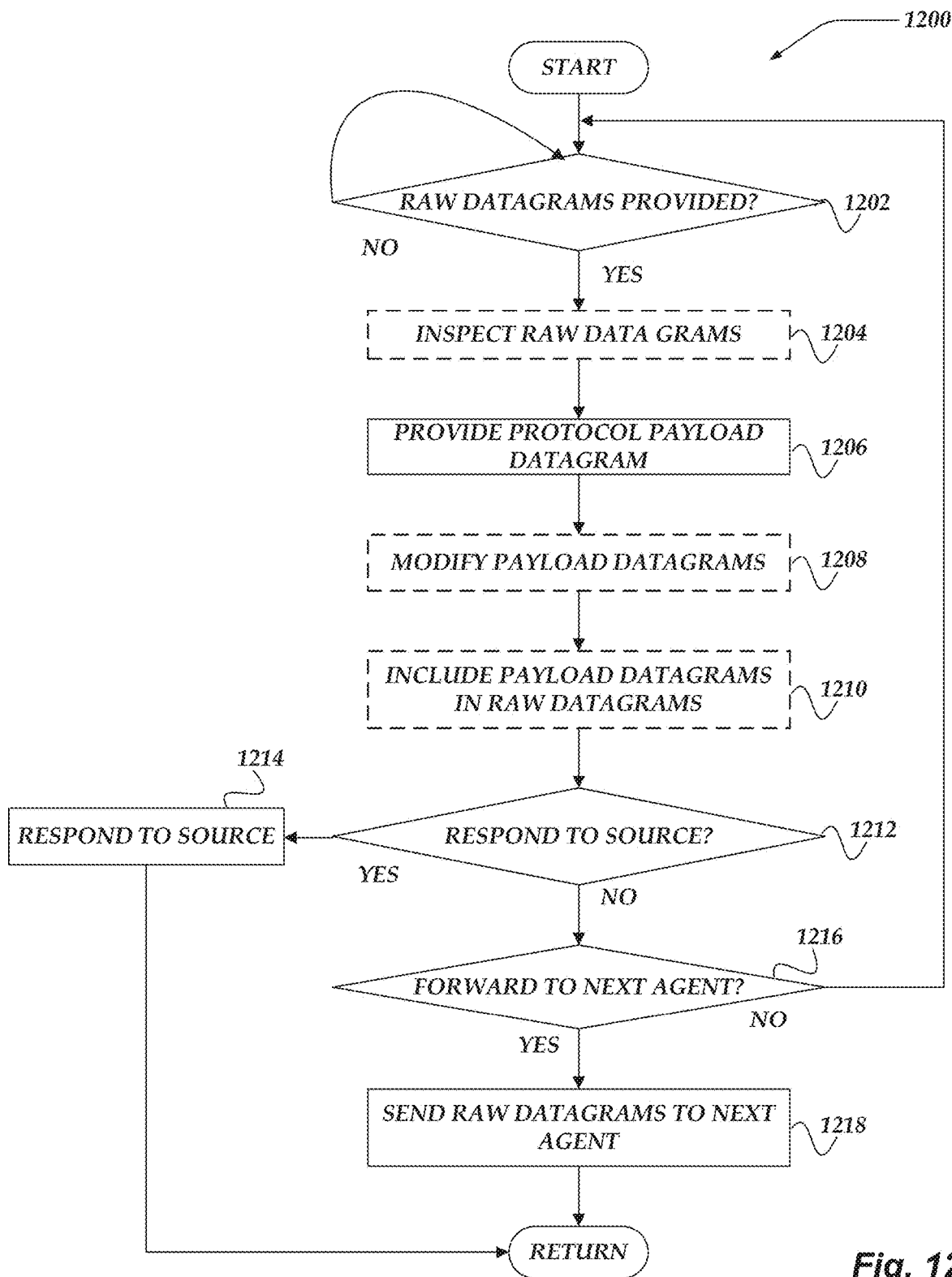
FIG. 12 illustrates a flowchart of a process for tunnelling with support for dynamic naming resolution in secured networks in accordance with one or more of the various embodiments.

FIG. 12 illustrates a flowchart of process 1200 for tunnelling with support for dynamic naming resolution in secured networks in accordance with one or more of the various embodiments. After a start block, at decision block 1202, in one or more of the various embodiments, if raw datagrams may be provided to a mesh agent, control may flow to block 1204; otherwise, control may loop back decision block 1202. As described above, in some embodiments, one or more raw datagrams provided to a network interface associated with a mesh agent may be provided directly to a protocol engine corresponding to the mesh agent.

For example, in some embodiments, rather than being provided communication protocol specific datagrams, such as, TCP or UDP datagrams, the protocol engine may provide raw datagrams (e.g., IP datagrams) that may include payload data comprising other high-level protocols.

At block 1204, in one or more of the various embodiments, optionally, the mesh agent may be arranged to inspect the raw datagrams.

In one or more of the various embodiments, protocol engines may be arranged to execute one or more rules, filters, or the like, to determine one or more characteristics of the raw datagrams. Accordingly, in some embodiments, protocol engines may be arranged to examine some or all of the raw datagrams to determine if they include one or more characteristics of interest. In some embodiments, the particular rules, filters, or the like, used for evaluating the raw datagrams may be provided via configuration information to account for local requirements or local circumstance. For example, in some embodiments, infrastructure security computers may provide one or more user interfaces that enable administrators to establish or activate one or more network traffic policies that may be propagated to mesh agents.

Note, this block is indicated as being optional because in some cases, for some embodiments, a mesh agent or protocol engine may be configured to omit inspection of the raw datagrams.

At block 1206, in one or more of the various embodiments, the mesh agent may be arranged to provide one or more protocol payload datagrams from the one or more raw datagrams.

In one or more of the various embodiments, name service engines may be arranged to determine the portions of the one or more raw datagrams that include protocol packets. In some embodiments, protocol engines may be arranged to examine protocol header fields, or the like, that may be included in the raw datagrams to determine the protocol payload datagrams that may be included in the raw datagrams.

In some embodiments, protocol engines may be arranged to identify one or more conventional/standards based communication protocols, such as, TCP, UDP, ICMP, FTP, or the like. Further, in some embodiments, protocol engines may be arranged to identify one or more so-called application protocols that may be carried in the payload portions of one or more communication protocols.

In one or more of the various embodiments, protocol engines may be arranged to generate one or more index pointers or offset values that correspond to locations in the raw datagrams where the protocol payload datagrams may be located.

Also, in some embodiments, protocol engines may be arranged to extract one or more copies of protocol payload datagrams depending on policy configuration. For example, in some embodiments, protocol engines may be arranged to store or log a copy of particular protocol payload datagrams that match one or more criteria.

Accordingly, in some embodiments, protocol engines may be arranged to include one or more parsers, filters, grammars, regular expressions, or the like, for providing protocol payload datagrams based on configuration information to account for local requirements or local circumstances.

Also, in some embodiments, protocol engines or mesh agents may be arranged to forward some or all of the raw datagrams to another service/process that may perform provide the protocol payload datagrams from the raw datagrams. Likewise, in some embodiments, protocol engines or mesh agents may be arranged to capture or forward some or all of the protocol payload datagrams, raw datagrams, or the like, to one or more other services/applications. For example, in some embodiments, protocol engines may be configured to send copies of protocol payload datagrams having particular characteristics to a logging service, or the like.

At block 1208, in one or more of the various embodiments, optionally, the mesh agent may be arranged to modify the protocol payload datagrams. In some cases, for some embodiments, mesh agents or protocol engines may be arranged to modify one or more header fields, payload fields, or the like, of the protocol payload datagrams.

Accordingly, in some embodiments, protocol engines may be arranged to include one or more parsers, filters, grammars, regular expressions, rules, instructions, or the like, for modifying protocol payload datagrams based on configuration information to account for local requirements or local circumstances.

At block 1210, in one or more of the various embodiments, optionally, protocol engines or mesh agents may be arranged to include the one or more protocol payload datagrams in one or more raw datagrams. Accordingly, in one or more of the various embodiments, one or more modified protocol datagrams may be included in the one or more raw datagrams. In some embodiments, protocol engines or mesh agents may be arranged to update the protocol datagrams in-place within the raw datagrams. Also, in some embodiments, protocol engines or mesh agents may be arranged to copy or overlay one or more modified protocol payload datagrams into one or more of the provided raw datagrams.

Note, this block is indicated as being optional because in some cases, protocol engines or mesh agents may be arranged to forward some or all of the raw datagrams absent modification. For example, in some cases, the inspection at block 1204 may identify one or more raw datagrams that may be forwarded absent modification.

At decision block 1212, in one or more of the various embodiments, if the mesh agent determines that a response should be provided to the source of the raw datagrams, control may flow to block 1214; otherwise, control may flow to decision block 1216.

In some cases, for some embodiments, protocol engines or mesh agents may be arranged to determine that it may respond directly to the sender rather than forwarding the raw datagrams (modified or unmodified) to another host, process, or target application. For example, in some embodiments, protocol engines may be arranged to recognize protocol handshaking, connection shutdown/cleanup, resets, or the like, and generate an appropriate response rather than forwarding those associated datagrams to the target application or other hosts/processes. In some cases, this may enable protocol engines or mesh agents to short circuit one or more datagram exchanges that may otherwise be required. For example, in some embodiments, a protocol engine may perform a TCP (or the like) handshake to establish a connection, providing a full-fledged connection to the mesh agent or client application. Thus, in this example, client applications that may be the target of the communication may be shielded from some or all handshake activity or other routine setup/teardown activity.

In some embodiments, protocol engines or mesh agents may be arranged to determine if a response should be provided here based on one or more characteristics of the raw datagrams, protocol payload, state of the connection/transmission, or the like. Also, in some embodiments, protocol engines or mesh agents may apply one or more rules or policies that may determine which portions of a communication may be handled directly by the protocol engines or mesh agent rather than being forwarded to the target client application.

Accordingly, in some embodiments, protocol engines may be arranged to include one or more parsers, filters, grammars, regular expressions, rules, instructions, or the like, for determining if datagrams may be eligible for direct response based on configuration information to account for local requirements or local circumstances.

At block 1214, in one or more of the various embodiments, the mesh agent may be arranged to provide a response that includes the raw datagrams to the source.

At decision block 1216, in one or more of the various embodiments, if the raw datagrams may be forwarded to the next mesh agent, control may flow to block 1218; otherwise, control may loop back to decision block 1202.

In some cases, protocol engines or mesh agents may be arranged to collect more than one datagram before forwarding them to the next hop in the path to the target client application. For example, in some cases, protocol engines or mesh agents may be arranged to batch one or more incoming datagrams into a single communication. Likewise, in some embodiments, protocol engines or mesh agents may be arranged to determine that a single incoming raw datagram may result into two or more outgoing raw datagrams. Thus, in general, protocol engines or mesh agents may be arranged to determine if the incoming raw datagrams have been processed such that they may be ready to send to the next hop on the way to the target.

At block 1218, in one or more of the various embodiments, the mesh agent may be arranged to send the one or more raw datagrams to a next mesh agent. As described above, infrastructure security computers may provide a path through the overlay network that connects the source client application with a target server. Accordingly, depending on where that path the instant mesh agent may be located, the datagrams may be forwarded to another mesh agent or to the target server.

Next, in one or more of the various embodiments, control may be returned to a calling process.

Figure 13:
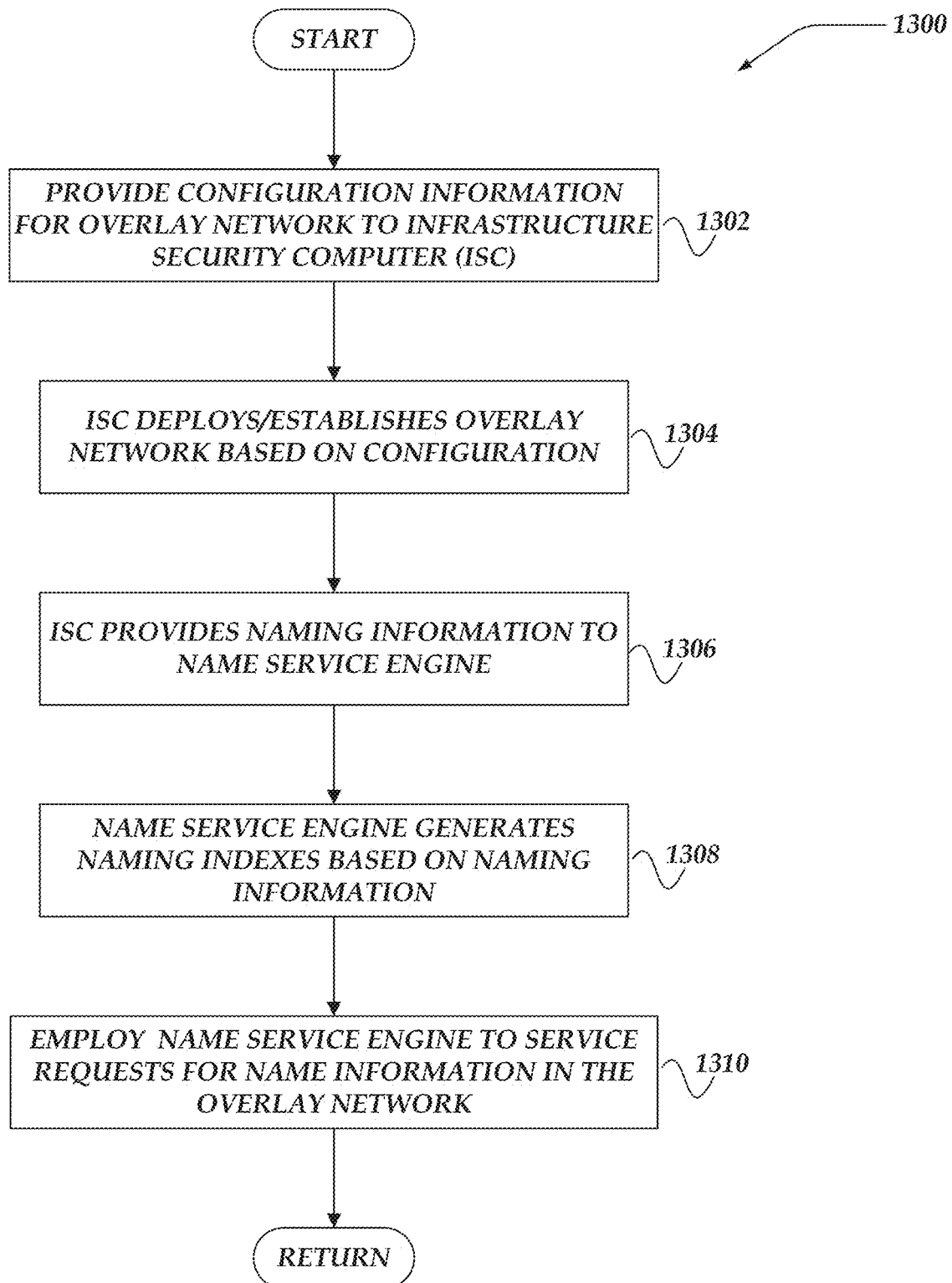
FIG. 13 illustrates a flowchart of a process for tunnelling with support for dynamic naming resolution in secured networks in accordance with one or more of the various embodiments.

FIG. 13 illustrates a flowchart of process 1300 for tunnelling with support for dynamic naming resolution in secured networks in accordance with one or more of the various embodiments. After a start block, at block 1302, in one or more of the various embodiments, configuration information for an overlay network may be provided to an infrastructure security computer. As described above, in some embodiments, organizations may employ an infrastructure security computer to configure an overlay network that may be applied on one or more physical underlay networks.

In some embodiments, infrastructure security computers may provide one or more user interfaces, or the like, that enable an overlay network and its policies to be declared by one or more administrators. In some embodiments, this configuration may include associating names of services, hosts, agents, or the like, with particular network addresses in the overlay network.

Further, in some embodiments, the configuration for the overlay network may include declaring one or more name service engines that may be available in the overlay network. Accordingly, in some embodiments, the overlay network configuration may explicitly define the one or more valid name service engines that may be available for tunnelling with support for dynamic naming resolution in the overlay network.

Also, in some embodiments, the configuration of the overlay network may include providing one or more cryptographic keys, security certificates, or the like, that may be associated with name service engines enabling infrastructure security computers to validate name service engines.

At block 1304, in one or more of the various embodiments, the infrastructure security computer may be arranged to deploy/establish the overlay network based on the configuration information.

In some embodiments, administrators of the underlay network may grant various rights or privileges to the infrastructure security computer to enable it access various interfaces, resources, users, or the like, in the underlay network.

Also, in some embodiments, deploying the overlay network may include activating/installing one or more name service engines. As described above, in some embodiments, name service engines may be arranged to embedded or co-located with one or more mesh agents in the overlay network. Also, in some embodiments, one or more name service engines may be deployed centrally in the overlay network such that one or more mesh agents or other hosts/services in the overlay network may submit requests for name information.

In one or more of the various embodiments, infrastructure security computer configuration information may explicitly the location (e.g., network addresses) or identity of some or all name service engines in the overlay network. Also, in some embodiments, name service engines associated with cryptographic keys, security certificates, or the like, may self-report their location/existence to the infrastructure security computer.

At block 1306, in some embodiments, the infrastructure security computer may be arranged to provide naming information to name service engines in the overlay network.

In one or more of the various embodiments, unlike conventional name service engines, name service engine in the overlay network may obtain the name information for the overlay network from the infrastructure security computers rather than requesting information from one or more name service servers that may be outside of the overlay network.

In one or more of the various embodiments, name service engines may be arranged to authenticate themselves with infrastructure security computer using cryptographic keys, security certificates, or the like. Also, in some embodiments, name service engines may be explicitly declared by the configuration information used to establish the overlay network.

At block 1308, in one or more of the various embodiments, the name service engine may be arranged to generate one or more naming indexes based on the naming information. In some embodiments, name service engines may be arranged to employ one or more indexes of name information to enable requests for name information to be efficiently resolved. Accordingly, in some embodiments, name service engine may be arranged to generate one or more indexes based on name information provided from the infrastructure security computers.

In some embodiments, name service engines may be arranged to include one or more parsers, or the like, that may be arranged to interpret the name information and include it into the one or more indexes. In some embodiments, name service engines may be arranged to employ rules, grammars, parsers, interpreters, or the like, provided or determined via configuration information to account for local requirements or local circumstances.

At block 1310, in one or more of the various embodiments, the name service engine may be employed to service one or more requests for name information in the overlay network. In one or more of the various embodiments, name service engines may be arranged to "listen" one or more network interfaces for name information requests. In some embodiments, name service engines co-located with mesh agents may be integrated with mesh agents such that a local API may be provided to support name information requests.

Next, in one or more of the various embodiments, control may be returned to a calling process.

Figure 14:
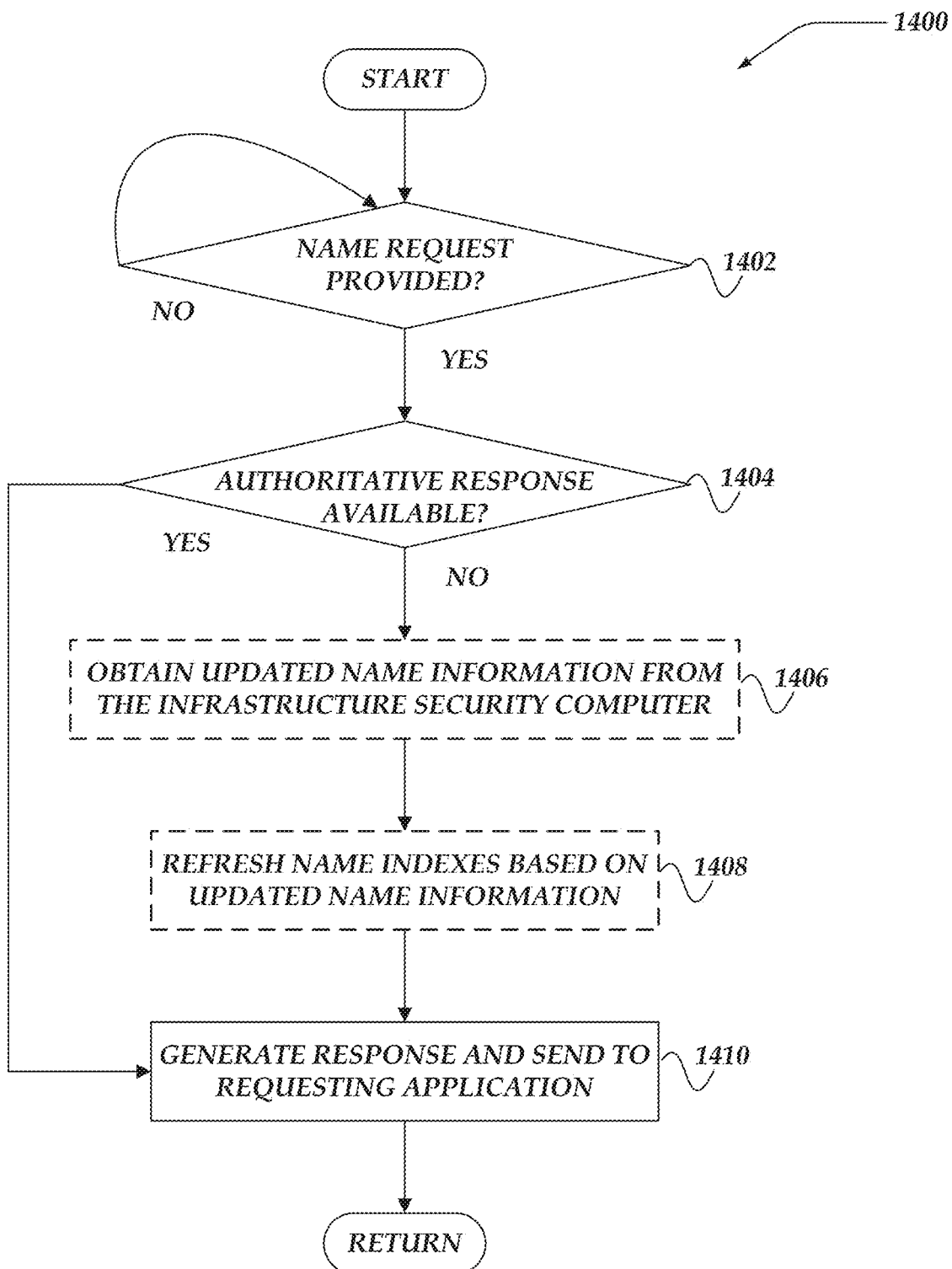
FIG. 14 illustrates a flowchart of a process for tunnelling with support for dynamic naming resolution in secured networks in accordance with one or more of the various embodiments.

FIG. 14 illustrates a flowchart of process 1400 for tunnelling with support for dynamic naming resolution in secured networks in accordance with one or more of the various embodiments. After a start block, at decision block 1402, in one or more of the various embodiments, if a request for name information may be provided to a name service engine, control may flow to decision block 1404; otherwise, control may loop back to decision block 1402.

As described above, in some embodiments, mesh agents may be arranged to request name information that maps text/character based names to network addresses in the overlay network. Accordingly, in some embodiments, name service engines may be arranged to accept requests for name information from one or more mesh agents or other services/applications in the overlay network.

As described above, in some embodiments, name service engine may be embedded locally in mesh agents. Also, in some embodiments, name service engines may be hosted on computers that may be separate from the mesh agents such that the requests may be provided to the name service engines over a network.

At decision block 1404, in one or more of the various embodiments, if the name service engine may provide an authoritative response to the request, control may flow to block 1410; otherwise, control may flow to block 1406.

In one or more of the various embodiments, name service engines may be arranged to maintain one or more indexes that may associate names with network addresses. In some embodiments, one or more records in the indexes may be associated with time-out values, expiration time/dates, or the like.

Also, in some cases, for some embodiments, name service engine may be provided requests that it may be unable to answer because the requested name information may not be included in the indexes.

Thus, in some embodiments, if name information relevant to a request may be expired, absent, or otherwise invalid an authoritative response may be unavailable.

At block 1406, in one or more of the various embodiments, optionally, the name service engine may be arranged to obtain updated name information from its associated infrastructure security computer.

As described, in some embodiments, name service engines may be arranged to obtain name information used for generated its indexes from one or more infrastructure security computers. Similarly, in some embodiments, if a name service engine determines that information for answer a request may be unavailable name service engines provide a request to an associated infrastructure security computer to obtain updated name information from the infrastructure security computer.

In one or more of the various embodiments, name service engines may be arranged to forward unresolved requests to an associated infrastructure security computer. Accordingly, in some embodiments, the infrastructure security computer may provide a response to the name service engine that may include name information corresponding to the forwarded requests.

Also, in some embodiments, name service engines may be arranged to provide a generalized request for updated name information to an associated infrastructure security computer. Accordingly, in some embodiments, in response to such a request, infrastructure security computers may be arranged to provide one or more responses that include the all the relevant changes to name information that may have occurred since the name information stored on the name service engine was last updated.

Also, in some embodiments, name service engines may be arranged to automatically disregard some requests. For example, in some embodiments, name service engines may be configured automatically disregard requests associated with particular network addresses or ranges or network addresses. Likewise, in some embodiments, name service engines may be configured to disregard requests associated with particular names. Accordingly, in some embodiments, name service engines may be arranged to employ one or more filters, rules, instructions, or the like provided via configuration information to determine if a request may be automatically discarded.

Note, this block is marked as being optional because in some cases, for some embodiments, name service engine may be configured to disregard or drop name requests if it may be unable to provide authoritative responses.

At block 1408, in one or more of the various embodiments, optionally, the name service engine may be arranged to refresh one or more name indexes based on the updated name information. In some embodiments, if the infrastructure security computer provides updated name information, name service engines may be arranged to incorporate that information into its one or more indexes. In some embodiments, name service engines may be arranged to include one or more parsers that may be arranged to interpret the name information and include it into the one or more indexes. In some embodiments, name service engines may be arranged to employ rules, grammars, parsers, interpreters, or the like, provided or determined via configuration information to account for local requirements or local circumstances.

Note, this block is marked as being optional because in some cases, for some embodiments, name service engine may be configured to disregard or drop name requests if it may be unable to provide authoritative responses.

At block 1410, in one or more of the various embodiments, the name service engine may be arranged to generate one or more responses to the name information requesting and provided them to the requesting application/agent. In one or more of the various embodiments, name service engines may be arranged to employ or support one or more conventional name service protocols (e.g., DNS protocol). Accordingly, in some embodiments, name service engines may be arranged to generate a response that conforms to the protocol of the request.

In some embodiments, name service engines may yet be unable to resolve the request. Accordingly, in some embodiments, the response may indicate as such. For example, in some embodiments, if the name service engine may be unable to resolve a request with its updated indexes, it may include a code or flag in the response to indicate that the request was unresolved.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing access to network resources in a network using one or more processors to execute instructions that are configured to cause actions, wherein the execution of the instructions enables performance of actions, comprising:

providing a plurality of mesh agents for an overlay network, wherein each mesh agent is hosted on one or more network computers in the overlay network; and in response to a network interface providing one or more raw datagrams to a mesh agent in the overlay network, performing further actions, including:

determining a payload protocol based on one or more payloads for the one or more raw datagrams;

determining one or more payload datagrams included in the one or more raw datagrams based on the payload protocol; and determining a request from a client based on the one or more payload datagrams and the payload protocol; and in response to an infrastructure security computer determining validation information that validates the request, performing further actions, including:

modifying the one or more payload datagrams to conform to one or more overlay network policies of the infrastructure security computer;

updating the one or more modified payload datagrams to include one or more updated-payloads based on the payload protocol and the validation information;

generating one or more new raw datagrams that include the one or more updated payload datagrams; and forwarding the one or more new raw datagram to a next mesh agent identified with the validation information, wherein the one or more new raw datagrams are configured to bypass communication management by a kernel level of an operating system and to directly communicate over a network interface with the next mesh agent.

2. The method of claim 1, further comprising:
providing a name service that associates a plurality of network addresses with a plurality of name values, wherein the associations are provided to the name service by the infrastructure security computer;
determining one or more name values associated with the request based on the payload protocol; and
providing another request to the name service based on the one or more name values, wherein a response from the name service includes one or more network addresses associated with the one or more name values.

3. The method of claim 1, further comprising:
providing a payload protocol status based on the payload protocol and the one or more payload datagrams, wherein the payload protocol status corresponds to the request; and
modifying the payload protocol status based on the one or more modified payload datagrams.

4. The method of claim 1, further comprising:
providing the one or more raw datagrams to the network interface, wherein the network interface is managed by an operating system that hosts the mesh agent; and
forwarding the one or more raw datagrams from the network interface to the mesh agent absent modification or interference by the operating system.

5. The method of claim 1, further comprising:
determining a network address in the overlay network based on the infrastructure security computer, wherein one or more portions of the network address include one or more values that the payload protocol reserves for use with processes associated with privileged users; and
assigning the network address to the mesh agent, wherein the mesh agent is associated with one or more non-privileged users.

6. The method of claim 1, further comprising:
modifying the overlay network based on one or more updates to the infrastructure security computer, wherein the one or more updates to the infrastructure security computer include associating one or more network addresses with a portion of the plurality of mesh agents; and
in response to the association of the one or more network addresses with the portion of the plurality of mesh agents, updating a name service to associate the one or more network addresses with name information that corresponds to each mesh agent included in the portion of the plurality of mesh agents.

7. A system for managing access to network resources, comprising:
a network computer, comprising:
a memory that stores at least instructions; and
one or more hardware processors that execute instructions that are configured to cause performance of actions, including:
providing a plurality of mesh agents for an overlay network, wherein each mesh agent is hosted on one or more network computers in the overlay network; and
in response to a network interface providing one or more raw datagrams to a mesh agent in the overlay network, performing further actions, including:
determining a payload protocol based on one or more payloads for the one or more raw datagrams;
determining one or more payload datagrams included in the one or more raw datagrams based on the payload protocol; and
determining a request from a client based on the one or more payload datagrams and the payload protocol; and
in response to an infrastructure security computer determining validation information that validates the request, performing further actions, including:
modifying the one or more payload datagrams to conform to one or more overlay network policies of the infrastructure security computer:
updating the one or more modified payload datagrams to include one or more updated-payloads based on the payload protocol and the validation information;
generating one or more new raw datagrams that include the one or more updated payload datagrams; and
forwarding the one or more new raw datagram to a next mesh agent identified with the validation information, wherein the one or more new raw datagrams are configured to bypass communication management by a kernel level of an operating system and to directly communicate over a network interface with the next mesh agent; and
a client computer, comprising:
a memory that stores at least instructions; and
one or more hardware processors that execute instructions that are configured to cause performance of actions, including:
providing the request.

8. The system of claim 7, wherein the one or more network computer processors execute instructions that perform actions further comprising:
providing a name service that associates a plurality of network addresses with a plurality of name values, wherein the associations are provided to the name service by the infrastructure security computer;
determining one or more name values associated with the request based on the payload protocol; and
providing another request to the name service based on the one or more name values, wherein a response from the name service includes one or more network addresses associated with the one or more name values.

9. The system of claim 7, wherein the one or more network computer processors execute instructions that perform actions further comprising:
providing a payload protocol status based on the payload protocol and the one or more payload datagrams, wherein the payload protocol status corresponds to the request; and
modifying the payload protocol status based on the one or more modified payload datagrams.

10. The system of claim 7, wherein the one or more network computer processors execute instructions that perform actions further comprising:
providing the one or more raw datagrams to the network interface, wherein the network interface is managed by an operating system that hosts the mesh agent; and
forwarding the one or more raw datagrams from the network interface to the mesh agent absent modification or interference by the operating system.

11. The system of claim 7, wherein the one or more network computer processors execute instructions that perform actions further comprising:

determining a network address in the overlay network based on the infrastructure security computer, wherein one or more portions of the network address include one or more values that the payload protocol reserves for use with processes associated with privileged users; and assigning the network address to the mesh agent, wherein the mesh agent is associated with one or more non-privileged users.

12. The system of claim 7, wherein the one or more network computer processors execute instructions that perform actions further comprising:

modifying the overlay network based on one or more updates to the infrastructure security computer, wherein the one or more updates to the infrastructure security computer include associating one or more network addresses with a portion of the plurality of mesh agents; and in response to the association of the one or more network addresses with the portion of the plurality of mesh agents, updating a name service to associate the one or more network addresses with name information that corresponds to each mesh agent included in the portion of the plurality of mesh agents.

13. A processor readable non-transitory storage media that includes instructions for managing access to network resources over a network, wherein execution of the instructions by one or more hardware processors on one or more network computers performs actions, comprising:

providing a plurality of mesh agents for an overlay network, wherein each mesh agent is hosted on one or more network computers in the overlay network; and in response to a network interface providing one or more raw datagrams to a mesh agent in the overlay network, performing further actions, including:

determining a payload protocol based on one or more payloads for the one or more raw datagrams;

determining one or more payload datagrams included in the one or more raw datagrams based on the payload protocol; and determining a request from a client based on the one or more payload datagrams and the payload protocol; and in response to an infrastructure security computer determining validation information that validates the request, performing further actions, including:

modifying the one or more payload datagrams to conform to one or more overlay network policies of the infrastructure security computer;

updating the one or more modified payload datagrams to include one or more updated-payloads based on the payload protocol and the validation information;

generating one or more new raw datagrams that include the one or more updated payload datagrams; and forwarding the one or more new raw datagram to a next mesh agent identified with the validation information, wherein the one or more new raw datagrams are configured to bypass communication management by a kernel level of an operating system and to directly communicate over a network interface with the next mesh agent.

14. The media of claim 13, further comprising:

providing a name service that associates a plurality of network addresses with a plurality of name values, wherein the associations are provided to the name service by the infrastructure security computer;

determining one or more name values associated with the request based on the payload protocol; and providing another request to the name service based on the one or more name values, wherein a response from the name service includes one or more network addresses associated with the one or more name values.

15. The media of claim 13, further comprising:

providing a payload protocol status based on the payload protocol and the one or more payload datagrams, wherein the payload protocol status corresponds to the request; and modifying the payload protocol status based on the one or more modified payload datagrams.

16. The media of claim 13, further comprising:

providing the one or more raw datagrams to the network interface, wherein the network interface is managed by an operating system that hosts the mesh agent; and forwarding the one or more raw datagrams from the network interface to the mesh agent absent modification or interference by the operating system.

17. The media of claim 13, further comprising:

determining a network address in the overlay network based on the infrastructure security computer, wherein one or more portions of the network address include one or more values that the payload protocol reserves for use with processes associated with privileged users; and assigning the network address to the mesh agent, wherein the mesh agent is associated with one or more non-privileged users.

18. The media of claim 13, further comprising:

modifying the overlay network based on one or more updates to the infrastructure security computer, wherein the one or more updates to the infrastructure security computer include associating one or more network addresses with a portion of the plurality of mesh agents; and in response to the association of the one or more network addresses with the portion of the plurality of mesh agents, updating a name service to associate the one or more network addresses with name information that corresponds to each mesh agent included in the portion of the plurality of mesh agents.

19. A network computer for managing access to network resources, comprising:

a memory that stores at least instructions; and one or more hardware processors that execute instructions that are configured to cause performance of actions, including:

providing a plurality of mesh agents for an overlay network, wherein each mesh agent is hosted on one or more network computers in the overlay network; and in response to a network interface providing one or more raw datagrams to a mesh agent in the overlay network, performing further actions, including:

determining a payload protocol based on one or more payloads for the one or more raw datagrams;

determining one or more payload datagrams included in the one or more raw datagrams based on the payload protocol; and determining a request from a client based on the one or more payload datagrams and the payload protocol; and in response to an infrastructure security computer determining validation information that validates the request, performing further actions, including:

modifying the one or more payload datagrams to conform to one or more overlay network policies of the infrastructure security computer;

updating the one or more modified payload datagrams to include one or more updated-payloads based on the payload protocol and the validation information;

generating one or more new raw datagrams that include the one or more updated payload datagrams; and forwarding the one or more new raw datagram to a next mesh agent identified with the validation information, wherein the one or more new raw datagrams are configured to bypass communication management by a kernel level of an operating system and to directly communicate over a network interface with the next mesh agent.

20. The network computer of claim 19, wherein the one or more processors execute instructions that perform actions further comprising:

providing a name service that associates a plurality of network addresses with a plurality of name values, wherein the associations are provided to the name service by the infrastructure security computer;

determining one or more name values associated with the request based on the payload protocol; and providing another request to the name service based on the one or more name values, wherein a response from the name service includes one or more network addresses associated with the one or more name values.

21. The network computer of claim 19, wherein the one or more processors execute instructions that perform actions further comprising:

providing a payload protocol status based on the payload protocol and the one or more payload datagrams, wherein the payload protocol status corresponds to the request; and modifying the payload protocol status based on the one or more modified payload datagrams.

22. The network computer of claim 19, wherein the one or more processors execute instructions that perform actions further comprising:

providing the one or more raw datagrams to the network interface, wherein the network interface is managed by an operating system that hosts the mesh agent; and forwarding the one or more raw datagrams from the network interface to the mesh agent absent modification or interference by the operating system.

23. The network computer of claim 19, wherein the one or more processors execute instructions that perform actions further comprising:

determining a network address in the overlay network based on the infrastructure security computer, wherein one or more portions of the network address include one or more values that the payload protocol reserves for use with processes associated with privileged users; and assigning the network address to the mesh agent, wherein the mesh agent is associated with one or more non-privileged users.

24. The network computer of claim 19, wherein the one or more processors execute instructions that perform actions further comprising:

modifying the overlay network based on one or more updates to the infrastructure security computer, wherein the one or more updates to the infrastructure security computer include associating one or more network addresses with a portion of the plurality of mesh agents; and in response to the association of the one or more network addresses with the portion of the plurality of mesh agents, updating a name service to associate the one or more network addresses with name information that corresponds to each mesh agent included in the portion of the plurality of mesh agents.

* * * * *